(12) United States Patent
Kimura et al.

(10) Patent No.: US 7,364,710 B2
(45) Date of Patent: Apr. 29, 2008

(54) SYSTEM FOR DECOMPOSING ORGANIC COMPOUND

(75) Inventors: Kazushi Kimura, Iruma (JP); Tomoyuki Naito, Higashimurayama (JP); Takahiro Terajima, Higashimurayama (JP); Takako Nakatou, Tokorozawa (JP); Kozo Nitta, Yokohama (JP); Shinji Noguchi, Sagamihara (JP)

(73) Assignee: Koken Ltd., Tokyo (JP)

( * ) Notice: Subject to any disclaimer, the term of this patent is extended or adjusted under 35 U.S.C. 154(b) by 590 days.

(21) Appl. No.: 10/397,166

(22) Filed: Mar. 27, 2003

(65) Prior Publication Data
US 2003/0185728 A1  Oct. 2, 2003

(30) Foreign Application Priority Data
Mar. 28, 2002 (JP) .............................. 2002-091947
Apr. 1, 2002 (JP) .............................. 2002-098981

(51) Int. Cl.
*B01J 19/08* (2006.01)
(52) U.S. Cl. .................................... 422/186.3; 422/172
(58) Field of Classification Search ............. 422/186.3, 422/172
See application file for complete search history.

(56) References Cited

U.S. PATENT DOCUMENTS

| 4,941,957 | A | * | 7/1990 | Zeff et al. ................ 204/157.3 |
| 5,393,394 | A | * | 2/1995 | Ikeda et al. .............. 204/158.2 |
| 5,397,552 | A | | 3/1995 | Weigold et al. |
| 5,582,741 | A | | 12/1996 | Kenmoku et al. |
| 6,238,628 | B1 | * | 5/2001 | Matsutani .................... 422/172 |
| 6,497,795 | B1 | * | 12/2002 | Kato ......................... 204/157.3 |
| 6,699,370 | B2 | * | 3/2004 | Kuriyama et al. ....... 204/157.3 |
| 6,833,115 | B2 | * | 12/2004 | Kato et al. .................. 422/121 |
| 2002/0103409 | A1 | | 8/2002 | Kuriyama et al. |

FOREIGN PATENT DOCUMENTS

| EP | 0 636 388 A1 | 2/1995 |
| EP | 1 005 881 A1 | 6/2000 |
| EP | 1 062 0989 A2 | 12/2000 |
| JP | 40-34605 | 12/1940 |
| JP | 49-109351 | 10/1974 |
| JP | 55-015627 | 2/1980 |
| JP | 55-015627 A * | 2/1980 |
| JP | 05-269374 | 10/1993 |
| JP | 07-116457 | 5/1995 |
| JP | 7-155543 | 6/1995 |
| JP | 08-024335 | 1/1996 |

(Continued)

*Primary Examiner*—Kishor Mayekar
(74) *Attorney, Agent, or Firm*—McDermott Will & Emery LLP

(57) ABSTRACT

A system for decomposing a liquid or gaseous organic compound comprises a ultraviolet decomposition unit and an intermediate product treatment apparatus. The ultraviolet decomposition unit decomposes an organic compound contained in polluted liquid or polluted gas by irradiating ultraviolet rays whose wavelength is less than 300 nm to the polluted liquid or the polluted gas containing the organic compound. An acid electrolytic water feed pipe and an alkali electrolytic water feed pipe are respectively connected to the intermediate product treatment apparatus through valves to neutralize an intermediate product, which results from decomposition of the organic compound, for decomposition by selectively adding strong alkali electrolytic water and strong acid electrolytic water to the polluted liquid or the polluted gas containing the intermediate product.

6 Claims, 39 Drawing Sheets

FOREIGN PATENT DOCUMENTS

| | | |
|---|---|---|
| JP | 8-511469 | 12/1996 |
| JP | 3059223 | 3/1999 |
| JP | 11-179195 | 7/1999 |
| JP | 2000-024514 A | 1/2000 |
| JP | 2000-051656 A | 2/2000 |
| JP | 2000-167352 A | 6/2000 |
| JP | 2000-225336 A | 8/2000 |
| JP | 2000-331649 A | 11/2000 |
| JP | P2001-170666 A | 6/2001 |
| JP | 2001-246222 A | 9/2001 |

* cited by examiner

|  | UV IRRADIATION TIME | | | |
|---|---|---|---|---|
|  | INITIAL CONCENTRATION | 5min | 10min | 20min |
| 185nm | 7.3 | 5.3 | 3.5 | 1.5 |
| 185+OXIDIZED WATER | | 4.1 | 2.5 | 1.1 |
| 254nm | 7.8 | ˙6.6 | 5.8 | 4.6 |
| 254nm+OXIDIZED WATER | | 5.1 | 3.8 | 2.7 |

UNIT: mg/L

|  | UV IRRADIATION TIME | | |
|---|---|---|---|
|  | INITIAL CONCENTRATION | 10min | 20min |
| 185nm | 8.7 | 4.1 | 0.9 |
| 185+OXIDIZED WATER |  | 3.4 | 1.2 |
| 254nm | 9.1 | 8.9 | 8.2 |
| 254nm+OXIDIZED WATER |  | 5.2 | 2.4 |

UNIT: mg/L

|  | | UV IRRADIATION TIME | |
|---|---|---|---|
|  | INITIAL CONCENTRATION | 10min | 20min |
| 185nm | 7.1 | 5.0 | 1.9 |
| 185+OXIDIZED WATER | | 3.0 | 2.7 |
| 254nm | 7.5 | 6.4 | 7.0 |
| 254nm+OXIDIZED WATER | | 4.3 | 3.8 |

UNIT: mg/L

|  | UV IRRADIATION TIME | | | |
|---|---|---|---|---|
|  | INITIAL CONCENTRATION | 5min | 10min | 20min |
| 185nm | 7.5 | 6.5 | 5.7 | 2.9 |
| 185+OXIDIZED WATER | | 6.4 | 5.6 | 3.2 |
| 254nm | 7.8 | 6.9 | 7.5 | 7.3 |
| 254nm+OXIDIZED WATER | | 6.7 | 5.6 | 4.8 |

UNIT: mg/L

FIG. 8

| WAVELENGTH | SAMPLE SOLUTION | IRRADIATION TIME | |
|---|---|---|---|
| | | 0min | 20min |
| 185nm | 1,1-DCE | 14.2 | 8.4 |
| | trans-1,2-DCE | 16.5 | 10.5 |
| | cis-1,2-DCE | 14.2 | 8.8 |
| | TCE | 10.8 | 6.2 |
| | PCE | 9.8 | 0.9 |
| 254nm | 1,1-DCE | 14.8 | 9.7 |
| | trans-1,2-DCE | 18.0 | 12.7 |
| | cis-1,2-DCE | 13.7 | 10.8 |
| | TCE | 10.3 | 7.4 |
| | PCE | 10.0 | 1.3 |

UNIT: mg/L

FIG. 9

| TEST CONDITION | TCE CONCENTRARION (mg/l) | DECOMPOSITION RATE (%) |
|---|---|---|
| BEFORE IRRADIATION | 0.1971 | |
| IRRADIATION FOR 1 MIN WITH GERMICIDAL LAMP TO QUARTZ TEST TUBE | 0.0314 | 84.1 |
| IRRADIATION FOR 5 MIN WITH GERMICIDAL LAMP TO QUARTZ TEST TUBE | 0.0101 | 94.9 |
| IRRADIATION FOR 5 MIN WITH BLACK LIGHT TO QUARTZ TEST TUBE | 0.1289 | 34.6 |

FIG. 10

| LIGHT INTENSITY (mW/cm2) | TCE CONCENTRATION IN 1% OF OXIDIZED WATER (mg/l) | TCE CONCENTRATION IN 3% OF OXIDIZED WATER (mg/l) | TCE CONCENTRATION IN 5% OF OXIDIZED WATER (mg/l) | TCE CONCENTRATION IN 10% OF OXIDIZED WATER (mg/l) |
|---|---|---|---|---|
| REFERENCE | 0.2622 | 0.2661 | 0.2723 | 0.2608 |
| 1.0 | 0.1991 | 0.1306 | 0.0992 | 0.0944 |
| 0.4 | 0.1653 | 0.1977 | 0.1771 | 0.1699 |
| 0.2 | 0.2474 | 0.2210 | 0.2227 | 0.2059 |

FIG. 11

| LIGHT INTENSITY (mW/cm2) | DECOMPOSITION RATE IN 1% OF OXIDIZED WATER (%) | DECOMPOSITION RATE IN 3% OF OXIDIZED WATER (%) | DECOMPOSITION RATE IN 5% OF OXIDIZED WATER (%) | DECOMPOSITION RATE IN 10% OF OXIDIZED WATER (%) |
|---|---|---|---|---|
| REFERENCE |  |  |  |  |
| 1.0 | 24.1 | 50.9 | 63.6 | 63.8 |
| 0.4 | 36.9 | 25.7 | 35.0 | 34.9 |
| 0.2 | 5.6 | 16.9 | 18.2 | 21.0 |

FIG. 13

| | TCE CONCENTRATION (mg/l) | DECOMPOSITION RATE (%) |
|---|---|---|
| REFERENCE CONCENTRATION (LIGHT OFF) | 0.2865 | |
| FLAW RATE 8L | 0.2337 | 18.4 |
| FLAW RATE 4L | 0.2134 | 25.5 |
| FLAW RATE 1L | 0.1127 | 60.7 |

FIG. 14

| | TCE CONCENTRATION (mg/l) | DECOMPOSITION RATE (%) |
|---|---|---|
| REFERENCE CONCENTRATION (LIGHT OFF) | 0.1980 | |
| FLAW RATE 2L | 0.1012 | 48.9 |
| FLAW RATE 4L | 0.1442 | 27.2 |
| FLAW RATE 8L | 0.1701 | 14.1 |

FIG. 16

(0.05mg/l, 800ml/min)

| | TCE CONCENTRATION (mg/l) | DECOMPOSITION RATE (%) | |
|---|---|---|---|
| REFERENCE CONCENTRATION (LIGHT OFF) | 0.052 | | |
| REACTION VESSEL 1 | 0.016 | 84.8 | |
| REACTION VESEL 2 | 0.020 | 83.8 | THEORETICAL VALUE |
| REACTION VESSEL 1+2 | 0.004 | 94.6 | 95.0% |

FIG. 17

(0.03mg/l, 1000ml/min)

| | TCE CONCENTRATION (mg/l) | DECOMPOSITION RATE (%) | |
|---|---|---|---|
| REFERENCE CONCENTRATION (LIGHT OFF) | 0.0280 | | |
| REACTION VESSEL 1 | 0.0104 | 62.9 | |
| REACTION VESEL 2 | 0.0128 | 54.3 | THEORETICAL VALUE |
| REACTION VESSEL 1+2 | 0.0033 | 88.2 | 83.0% |

FIG. 18

(0.03mg/l, 1000ml/min)

|  | TCE CONCENTRATION (mg/l) | DECOMPOSITION RATE (%) | |
|---|---|---|---|
| REFERENCE CONCENTRATION (LIGHT OFF) | 0.362 | | |
| REACTION VESSEL 1 | 0.222 | 38.7 | |
| REACTION VESEL 2 | 0.242 | 33.1 | THEORETICAL VALUE |
| REACTION VESSEL 1+2 | 0.145 | 59.9 | 59.0% |

FIG. 19

(3.0mg/l, 1000ml/min)

|  | TCE CONCENTRATION (mg/l) | DECOMPOSITION RATE (%) | |
|---|---|---|---|
| REFERENCE CONCENTRATION (LIGHT OFF) | 2.73 | | |
| REACTION VESSEL 1 | 2.43 | 11.4 | |
| REACTION VESEL 2 | 2.54 | 6.9 | THEORETICAL VALUE |
| REACTION VESSEL 1+2 | 2.20 | 19.4 | 17.1% |

FIG. 23

| | MESUREMENT POSITION | | | | | | |
|---|---|---|---|---|---|---|---|
| | ① | | ② | | ③ | | ④ |
| SUBSTANCE NAME | 10min | 30min | 10min | 30min | 10min | 30min | 30min |
| TCE | 55.0 | 54.9 | 1.16 | 1.19 | 0.637 | 0.710 | — |
| HYDROGEN CHLORIDE | — | — | 25 | 25 | ND | ND | — |
| PHOSGENE | — | — | — | — | 1.9 | 2.0 | ND |
| CHLORINE | — | — | ND | ND | — | — | — |
| OZONE | — | — | 20 | 20 | 10 | — | ND |

FIG. 24

| MESUREMENT TIME (min) | pH IN SCRUBBER |
|---|---|
| 0 | 11.0 |
| 10 | 10.7 |
| 30 | 10.95 |

FIG. 25

| | MESUREMENT POSITION | | | | | | |
|---|---|---|---|---|---|---|---|
| | ① | | ② | | ③ | | ④ |
| SUBSTANCE NAME | 10min | 30min | 10min | 30min | 10min | 30min | 30min |
| TCE | 102 | 98.2 | 0.470 | 0.367 | 0.292 | 0.216 | — |
| HYDROGEN CHLORIDE | — | — | 45 | 50 | ND | — | — |
| PHOSGENE | — | — | — | — | 3.0 | 2.8 | ND |
| CHLORINE | — | — | ND | — | — | — | — |
| OZONE | — | — | 14 | 13 | 11 | 12 | ND |

FIG. 26

| MESUREMENT TIME (min) | pH IN SCRUBBER |
|---|---|
| 0 | 10.95 |
| 10 | 10.94 |
| 30 | 11.01 |

FIG. 27

| min | 0 | 10 | 30 | 50 | 90 | REMOVAL RATE (90min) |
|---|---|---|---|---|---|---|
| ① | 10 | 10 | 10 | 10 | 10 | |
| ② | 2.29 | 2.2 | 1.9 | 1.785 | 1.65 | 83.5% |
| ③ | 0.478 | 0.47 | 0.396 | 0.389 | 0.376 | 96.2% |
| ④ | ND | ND | ND | ND | ND | 100% |

FIG. 28

| min | 0 | 10 | 30 | 50 | 90 | REMOVAL RATE (90min) |
|---|---|---|---|---|---|---|
| SO2 | | | | | | |
| ② | 8 | 30 | 30 | 35 | 35 | |
| ③ | — | 0.3 | 20 | 25 | 30 | 14.3% |
| ④ | ND | ND | ND | ND | ND | 100% |
| O3 | | | | | | |
| ② | — | — | — | — | 17 | |
| ③ | — | — | — | — | 5 | 70.6% |
| ④ | — | — | — | — | ND | 100% |

FIG. 29

| min | 0 | 10 | 30 | 50 | REMOVAL RATE (50min) |
|---|---|---|---|---|---|
| ① | 9 | 9 | 9 | 10.8 | |
| ② | 4.632 | 4.752 | 4.848 | 5.334 | 50.6% |
| ③ | 1.764 | 1.68 | 1.734 | 1.86 | 82.8% |
| ④ | ND | ND | ND | ND | 100% |

FIG. 30

| min | 0 | 10 | 30 | 50 | REMOVAL RATE (50min) |
|---|---|---|---|---|---|
| $CH_3COOH$ | | | | | |
| ② | ND | ND | ND | ND | |
| ③ | ND | ND | ND | ND | |
| ④ | ND | ND | ND | ND | |
| $O_3$ | | | | | |
| ② | 20 | 18 | 18 | 18 | |
| ③ | 10 | 10 | 7 | 7 | 61.1% |
| ④ | ND | ND | ND | ND | 100% |

FIG. 31

| min | 0 | 10 | 30 | 50 | REMOVAL RATE (50min) |
|---|---|---|---|---|---|
| ① | 10 | 10.1 | 10.7 | 9.8 | |
| ② | 3.683 | 5.737 | 6.206 | 5.679 | 42.1% |
| ③ | 0.074 | 0.081 | 0.066 | 0.078 | 99.2% |
| ④ | ND | ND | ND | ND | 100% |

FIG. 32

| min | 0 | 10 | 30 | 50 | REMOVAL RATE (50min) |
|---|---|---|---|---|---|
| NOx | | | | | |
| ② | ND | ND | ND | ND | |
| ③ | ND | ND | ND | ND | |
| ④ | ND | ND | ND | ND | |
| O3 | | | | | |
| ② | 17 | 2 | 20 | 20 | |
| ③ | 7 | 8 | 10 | 10 | 50.0% |
| ④ | ND | ND | ND | ND | 100% |

FIG. 33

| min | 0 | 10 | 30 | 50 | REMOVAL RATE (50min) |
|---|---|---|---|---|---|
| ① | 9.7 | 9.7 | 9.7 | 11.6 | |
| ② | 13.1 | 8.856 | 6.489 | 6.596 | 43.1% |
| ③ | 1.183 | 1.474 | 1.59 | 1.736 | 85.0% |
| ④ | ND | ND | ND | ND | 100% |

FIG. 34

| min | 0 | 10 | 30 | 50 | REMOVAL RATE (50min) |
|---|---|---|---|---|---|
| NOx | | | | | |
| ② | ND | ND | ND | ND | |
| ③ | ND | ND | ND | ND | |
| ④ | ND | ND | ND | ND | |
| O3 | | | | | |
| ② | 20 | 20 | 20 | 20 | |
| ③ | 10 | 10 | 10 | 8 | 60.0% |
| ④ | ND | ND | ND | ND | 100% |

FIG. 35

| min | 0 | 10 | 30 | 50 | REMOVAL RATE (50min) |
|---|---|---|---|---|---|
| ① | 9.9 | 9.9 | 9.9 | 9.5 | |
| ② | 3.704 | 4.248 | 4.647 | 4.637 | 51.2% |
| ③ | 0.411 | 0.497 | 0.495 | 0.508 | 94.7% |
| ④ | ND | ND | ND | ND | 100% |

FIG. 36

| min | 0 | 10 | 30 | 50 | REMOVAL RATE (50min) |
|---|---|---|---|---|---|
| NOx | | | | | |
| ② | ND | ND | ND | ND | |
| ③ | ND | ND | ND | ND | |
| ④ | ND | ND | ND | ND | |
| O3 | | | | | |
| ② | 20 | 20 | 20 | 20 | |
| ③ | 14 | 10 | 15 | 14 | 30.0% |
| ④ | ND | ND | ND | ND | 100% |

FIG. 37

| min | 0 | 10 | 30 | 50 | REMOVAL RATE (50min) |
|---|---|---|---|---|---|
| ① | 11 | 11 | 11 | 11 | |
| ② | 9.438 | 8.536 | 9.02 | 7.876 | 28.4% |
| ③ | 2.002 | 1.87 | 1.958 | 1.892 | 82.8% |
| ④ | ND | ND | ND | ND | 100% |

FIG. 38

| min | 0 | 10 | 30 | 50 | REMOVAL RATE (50min) |
|---|---|---|---|---|---|
| $O_3$ | | | | | |
| ② | 25 | 25 | 25 | 25 | |
| ③ | 18 | 14 | 16 | 16 | 36.0% |
| ④ | ND | ND | ND | ND | 100% |

FIG. 39

| min | 0 | 10 | 30 | 50 | REMOVAL RATE (50min) |
|---|---|---|---|---|---|
| ① | 9.9 | 10.2 | 9.6 | 10.2 | |
| ② | 3.164 | 1.896 | 1.513 | 1.503 | 85.3% |
| ③ | 0.065 | 0.057 | 0.064 | 0.07 | 99.3% |
| ④ | ND | ND | ND | ND | 100% |

FIG. 40

| min | 0 | 10 | 30 | 50 | REMOVAL RATE (50min) |
|---|---|---|---|---|---|
| $SO_2$ | | | | | |
| ② | 50 | 45 | 50 | 40 | |
| ③ | 40 | 25 | 10 | 40 | 0.0% |
| ④ | ND | ND | ND | ND | 100% |
| $H_2S$ | | | | | |
| ② | ND | ND | ND | ND | |
| ③ | ND | ND | ND | ND | |
| ④ | ND | ND | ND | ND | 100% |
| $O_3$ | | | | | |
| ② | 20 | 20 | 16 | 20 | |
| ③ | 10 | 8 | 10 | 10 | 50.0% |
| ④ | ND | ND | ND | ND | 100% |

| TREATMENT SPEED | 400L/min | | 300L/min | | 200L/min | | 100L/min | |
|---|---|---|---|---|---|---|---|---|
| LIGHTING PATTERN | UPSTREAM CONCENTRATION ppm | DOWNSTREAM CONCENTRATION ppm | UPSTREAM CONCENTRATION ppm | DOWNSTREAM CONCENTRATION ppm | UPSTREAM CONCENTRATION ppm | DOWNSTREAM CONCENTRATION ppm | UPSTREAM CONCENTRATION ppm | DOWNSTREAM CONCENTRATION ppm |
| 1 | 53.7 | 3.4 | 51.5 | 1.8 | 61.7 | 0.5 | 50.9 | 0.2 |
| 2 | 53.4 | 4.7 | 51.4 | 3.1 | 51.6 | 0.9 | 50.4 | 0.2 |
| 3 | 51.9 | 5.0 | 50.4 | 3.4 | 50.4 | 1.2 | 50.2 | 0.2 |
| 4 | 52.9 | 21.2 | 51.5 | 14.0 | 51.1 | 6.7 | 50.0 | 0.3 |
| 5 | 53.5 | 33.4 | 51.6 | 25.9 | 51.1 | 15.9 | 51.8 | 3.4 |

FLAW RATE (L/min)

| TREATMENT SPEED | 400L/min | | 300L/min | | 200L/min | | 100L/min | |
|---|---|---|---|---|---|---|---|---|
| LIGHTING PATTERN | UPSTREAM CONCENTRATION ppm | DOWNSTREAM CONCENTRATION ppm | UPSTREAM CONCENTRATION ppm | DOWNSTREAM CONCENTRATION ppm | UPSTREAM CONCENTRATION ppm | DOWNSTREAM CONCENTRATION ppm | UPSTREAM CONCENTRATION ppm | DOWNSTREAM CONCENTRATION ppm |
| 1 | 51.6 | 4.7 | 50.9 | 3.3 | 50.0 | 1.8 | 51.0 | 0.5 |
| 2 | 51.0 | 6.3 | 50.3 | 4.2 | 49.6 | 2.8 | 51.2 | 0.5 |
| 3 | 50.8 | 7.3 | 49.6 | 4.9 | 49.0 | 3.2 | 51.8 | 0.8 |
| 4 | 51.3 | 19.8 | 50.7 | 14.7 | 49.2 | 8.2 | 51.0 | 1.52 |
| 5 | 50.0 | 28.7 | 49.2 | 23.6 | 48.0 | 16.6 | 51.7 | 5.7 |

| TREATMENT SPEED | 400L/min | | 300L/min | | 200L/min | | 100L/min | |
|---|---|---|---|---|---|---|---|---|
| LIGHTING PATTERN | UPSTREAM CONCENTRATION ppm | DOWNSTREAM CONCENTRATION ppm | UPSTREAM CONCENTRATION ppm | DOWNSTREAM CONCENTRATION ppm | UPSTREAM CONCENTRATION ppm | DOWNSTREAM CONCENTRATION ppm | UPSTREAM CONCENTRATION ppm | DOWNSTREAM CONCENTRATION ppm |
| 1 | 49.8 | 31.8 | 50.0 | 17.3 | 51.3 | 9.1 | 49.7 | 1.4 |
| 2 | 50.5 | 34.1 | 50.4 | 26.0 | 51.3 | 18.1 | 50.1 | 3.2 |
| 3 | 50.9 | 40.6 | 50.9 | 28.7 | 51.3 | 21.0 | 50.4 | 4.7 |
| 4 | 53.3 | 47.5 | 48.7 | 34.8 | 50.6 | 31.3 | 51.1 | 14.5 |
| 5 | 49.8 | | 50.4 | 46.4 | 49.8 | 45.0 | 50.1 | 37.5 |

FLOW RATE (L/min)

| TREATMENT SPEED | 400L/min | | 300L/min | | 200L/min | | 100L/min | |
|---|---|---|---|---|---|---|---|---|
| LIGHTING PATTERN | UPSTREAM CONCENTRATION ppm | DOWNSTREAM CONCENTRATION ppm | UPSTREAM CONCENTRATION ppm | DOWNSTREAM CONCENTRATION ppm | UPSTREAM CONCENTRATION ppm | DOWNSTREAM CONCENTRATION ppm | UPSTREAM CONCENTRATION ppm | DOWNSTREAM CONCENTRATION ppm |
| 1 | 49.7 | 44.2 | 51.6 | 42.1 | 50.0 | 39.8 | 52.5 | 26.5 |
| 2 | 49.3 | 46.2 | 52.3 | 45.4 | 49.9 | 42.8 | 56.7 | 28.2 |
| 3 | 49.1 | 46.4 | 51.9 | 45.6 | 49.8 | 43.7 | 55.2 | 29.4 |
| 4 | 48.2 | 47.0 | 51.5 | 46.5 | 49.6 | 46.0 | 58.8 | 35.9 |
| 5 | 48.1 | 48.9 | 51.5 | 47.4 | 50.8 | 50.2 | 51.7 | 44.0 |

| TREATMENT SPEED | 400L/min | | 300L/min | | 200L/min | | 100L/min | |
|---|---|---|---|---|---|---|---|---|
| LIGHTING PATTERN | UPSTREAM CONCENTRATION ppm | DOWNSTREAM CONCENTRATION ppm | UPSTREAM CONCENTRATION ppm | DOWNSTREAM CONCENTRATION ppm | UPSTREAM CONCENTRATION ppm | DOWNSTREAM CONCENTRATION ppm | UPSTREAM CONCENTRATION ppm | DOWNSTREAM CONCENTRATION ppm |
| 1 | 51.6 | 48.6 | 49.5 | 45.9 | 48.4 | 41.6 | 53.9 | 34.3 |
| 2 | 51.5 | 49.0 | 49.7 | 47.3 | 49.6 | 44.3 | 52.5 | 38.9 |
| 3 | 50.1 | 48.6 | 49.7 | 47.8 | 50.2 | 46.0 | 52.0 | 40.6 |
| 4 | 47.7 | 47.5 | 48.7 | 48.2 | 51.4 | 49.1 | 53.8 | 47.0 |
| 5 | 47.1 | 47.6 | 48.3 | 48.7 | 50.4 | 49.4 | 49.1 | 48.7 |

| TREATMENT SPEED | 100L/min | |
|---|---|---|
| LIGHTING PATTERN | UPSTREAM CONCENTRATION ppm | DOWNSTREAM CONCENTRATION ppm |
| 1 | 48.3 | 42.1 |
| 2 | 49.0 | 45.0 |
| 3 | 49.4 | 46.1 |
| 4 | 48.7 | 46.3 |
| 5 | 48.5 | 48.1 |

FIG. 54

| ULTRAVIOLET LAMP | MEASUREMENT TIME (min) | TAP WATER | AQUA OXIDIZED WATER | STRONG ALKALI WATER | MIXED WATER |
|---|---|---|---|---|---|
| | | TCE CONCENTRATION (ppm) | TCE CONCENTRATION (ppm) | TCE CONCENTRATION (ppm) | TCE CONCENTRATION (ppm) |
| OFF | 0 | 9.778 | 10.251 | 10.600 | 10.417 |
| | 10 | 9.959 | 10.223 | 10.553 | 10.459 |
| | 20 | 9.893 | 10.214 | 10.451 | 10.432 |
| | 30 | 9.784 | 10.477 | 10.446 | 10.560 |
| ON | 40 | 8.844 | 6.199 | 5.942 | 6.005 |
| | 50 | 8.724 | 6.020 | 5.027 | 4.910 |
| | 60 | 8.568 | 6.515 | 6.617 | 5.419 |
| OFF | 70 | 10.116 | 10.249 | 10.494 | 10.573 |
| | 80 | 10.187 | 10.438 | 10.663 | 10.519 |
| AVERAGE CONCENTRATION AT LIGHT OFF | | 9.953 | 10.309 | 10.534 | 10.493 |
| AVERAGE CONCENTRATION AT LIGHT ON | | 8.712 | 6.244 | 5.862 | 5.445 |
| DECOMPOSITION(%) | | 12.47 | 39.43 | 44.35 | 48.11 |

FIG. 59A

| IRADIATION TIME min | BLANK ppm | 185nm ppm | 254nm ppm | BLACK LIGHT ppm |
|---|---|---|---|---|
| 0 | 8.86 | 8.83 | 8.38 | 8.68 |
| 1 | 8.60 | 2.89 | 8.01 | 8.55 |
| 3 | 8.43 | 0.24 | 6.29 | 8.43 |
| 5 | 8.27 | 0.15 | 4.73 | 8.32 |
| 10 | 7.96 | 0.06 | 2.60 | 8.08 |
| 20 | 7.45 | 0.04 | 1.20 | 7.64 |

FIG. 59B

| IRADIATION TIME min | BLANK ppm | 185nm ppm | 254nm ppm | BLACK LIGHT ppm |
|---|---|---|---|---|
| 0 | 86.04 | 88.2 | 85.78 | 79.42 |
| 1 | 84.48 | 5.72 | 82.88 | 78.38 |
| 3 | 82.94 | 0.10 | 0.06 | 77.88 |
| 5 | 81.74 | 0.10 | 0.06 | 76.48 |
| 10 | 79.22 | 0.06 | 0.06 | 74.28 |
| 20 | 75.38 | 0.06 | 0.04 | 70.34 |

FIG. 60A

| IRADIATION TIME min | BLANK ppm | 185nm ppm | 254nm ppm | BLACK LIGHT ppm |
|---|---|---|---|---|
| 0 | 9.83 | 10.13 | 10.24 | 9.90 |
| 1 | 9.62 | 5.38 | 7.89 | 9.78 |
| 3 | 9.35 | 1.85 | 1.94 | 9.59 |
| 5 | 9.13 | 0.82 | 0.83 | 9.46 |
| 10 | 8.66 | 0.30 | 0.49 | 9.16 |
| 20 | 7.99 | 0.15 | 0.60 | 8.69 |

FIG. 60B

| IRADIATION TIME min | BLANK ppm | 185nm ppm | 254nm ppm | BLACK LIGHT ppm |
|---|---|---|---|---|
| 0 | 80.28 | 78.20 | 85.42 | 85.08 |
| 1 | 77.64 | 29.04 | 37.18 | 83.06 |
| 3 | 75.64 | 0.30 | 0.06 | 80.70 |
| 5 | 74.08 | 0.10 | 0.04 | 78.94 |
| 10 | 70.98 | 0.06 | 0.00 | 75.64 |
| 20 | 66.48 | 0.06 | 0.04 | 70.72 |

FIG. 61A

| IRADIATION TIME min | BLANK ppm | 185nm ppm | 254nm ppm | BLACK LIGHT ppm |
|---|---|---|---|---|
| 0 | 9.61 | 10.36 | 9.94 | 10.01 |
| 1 | 9.54 | 5.80 | 9.58 | 9.96 |
| 3 | 9.56 | 0.75 | 8.28 | 9.97 |
| 5 | 9.59 | 0.49 | 7.32 | 9.96 |
| 10 | 9.70 | 0.20 | 5.91 | 9.94 |
| 20 | 9.82 | 0.10 | 4.37 | 9.78 |

FIG. 61B

| IRADIATION TIME min | BLANK ppm | 185nm ppm | 254nm ppm | BLACK LIGHT ppm |
|---|---|---|---|---|
| 0 | 89.56 | 89.14 | 89.14 | 87.94 |
| 1 | 88.00 | 44.30 | 87.08 | 86.68 |
| 3 | 87.02 | 0.66 | 86.68 | 86.40 |
| 5 | 86.10 | 0.26 | 85.78 | 85.96 |
| 10 | 84.16 | 0.14 | 82.90 | 84.46 |
| 20 | 81.06 | 0.08 | 74.64 | 81.90 |

FIG. 62

| IRRADIATION TIME (sec.) | CONCENTRATION (ppm) |
|---|---|
| 0 | 10.809 |
| 30 | 8.535 |
| 60 | 5.261 |

SYSTEM FOR DECOMPOSING ORGANIC COMPOUND

BACKGROUND OF THE INVENTION

1. Field of the Invention

This invention relates to a system for decomposing a gaseous or liquid organic compound.

2 Description of the Prior Art

Organic compounds such as trichloroethylene and tetrachloroethylene have been used over a long term of years as detergents and solvents in the field related to semiconductors as well as the field of metal oil cleaning, dry cleaning and the like because of their high solvency.

However, it has been recently ascertained that carcinogen is contained in these chlorine organic compounds, so that their harmfulness constitutes a social problem, resulting in enforcement of regulation on emission of the chlorine organic compounds. For this reason, in places of industries that have emitted a large quantity of chlorine organic compounds after use in the past, pollution of the soil, as well as pollution of the ground water, within the sites and the peripheries thereof is at serious issue.

In addition, polluted gas containing a certain kind of organic compound emits an offensive odor, which sometimes causes environmental deterioration.

To purify the ground water, there has been normally the need for regeneration of an organic compound by pumping up polluted ground water with a storage pump and then removing the organic compound contained in the pumped-up ground water by adsorption with activated carbon, or alternatively, separating the organic compound contained in the polluted ground water by adsorption with the activated carbon or the like after separating the organic compound as exhaust gas with the aeration equipment. For this reason, the large-scaled adsorption equipment using the activated carbon is required for places that are polluted in high concentration over a wide area, so that a burden on the facility cost, as well as the running cost, constitutes a problem.

In addition, to purify the soil, there has been the need for regeneration of an organic compound by drawing soil gas by suction and then removing the organic compound contained in the soil gas by adsorption with activated carbon. For this reason, the large-scaled adsorption equipment using the activated carbon is also required for places that are polluted in high concentration over a wide area, so that a burden on the facility cost, as well as the running cost, constitutes a problem.

If making an attempt to remove the organic compound contained in the soil gas by adsorption solely with the activated carbon, the activated carbon needs to be exchanged frequently, and besides, a tremendous labor, as well as an enormous expense, is required for exchange and regeneration of the activated carbon, disposal of the wasted activated carbon and the like, resulting in a remarkable increase in burden on enterprises to realize purification of the soil.

On the other hand, a technique for decomposing an organic compound by ultraviolet irradiation is well known. For surface cleaning of a semiconductor wafer, for instance, an Excimer lamp and the like are used for irradiation of high energy ultraviolet rays (whose wavelength is 172 nm) to decompose the organic compound on the wafer surface. Irradiation of high-energy ultraviolet rays as described above results in decomposition of the organic compound in an extremely short period of time. However, the Excimer lamp is exceptionally expensive and needs not only the enormous facility cost but also the extremely high power consumption, so that it is supposed that the Excimer lamp is not suited to be of practical use for purification of the soil.

In addition, if making an attempt to decompose the organic compound by ultraviolet irradiation with a low pressure mercury lamp, a middle pressure mercury lamp and high pressure mercury lamp that are available at low cost, an unstably reactive substance such as hydrogen chloride and halacetic acid is produced as an intermediate product, and as a result, it takes much time to decompose the intermediate product into up to stable substances.

In this connection, in Japanese Patent Application Laid-open No. 8-24335, there is disclosed a method for decomposing an organic chlorine compound by steps of decomposing the organic chlorine compound into up to a reaction intermediate having chlorine atoms by irradiating ultraviolet rays inclusive of ultraviolet rays whose wavelength is not more than 300 nm to gas containing the organic chlorine compound, and further decomposing the reaction intermediate through the biological treatment.

The biological treatment has the advantage of adaptability to the environment, whereas it presents problems such as a difficulty in managing the treatment and a need for much time to conduct the treatment due to the extremely slow proceeding of decomposition. In particular, it is supposed that the biological treatment is not enough to cope with high concentration pollution.

SUMMARY OF THE INVENTION

It is an object of the present invention to provide a system for decomposing a liquid or gaseous organic compound, and more specifically, a decomposing system which may decompose polluted liquid or polluted gas containing an organic compound efficiently in a short period of time, is easy to treat an intermediate product resulting from ultraviolet decomposition of the organic compound, and permits miniaturization of a purifying apparatus used for the final waste water treatment so that there is less facility cost required, as well as less running cost required.

A system for decomposing an organic compound according to the present invention comprises a ultraviolet decomposition unit that decomposes an organic compound contained in polluted liquid or polluted gas by irradiating ultraviolet rays whose wavelength is less than 300 nm to the polluted liquid or polluted gas containing the organic compound, and an intermediate product treatment apparatus that is connected to an acid electrolytic water feed pipe and an alkali electrolytic water feed pipe through valves and neutralizes an intermediate product, which results from decomposition of the organic compound, for decomposition by selectively adding strong alkali electrolytic water or strong acid electrolytic water to the intermediate product or the polluted liquid containing the intermediate product.

It is supposed that the organic compound contained in the polluted liquid or the polluted gas is decomposed as the result of segmentation of its chemical bond by ultraviolet irradiation, while the intermediate products resulting from decomposition of the organic compound are placed in the form of admixture in an unstable radical state by ultraviolet irradiation. These unstable intermediate products are neutralized or decomposed in touch with the strong alkali electrolytic water or the strong acid electrolytic water, and as a result, may be transformed into more stable harmless substances. In addition, the strong alkali electrolytic water or the strong acid electrolytic water added or sprayed to the polluted liquid or the polluted gas is harmless to the human body, and therefore, is not in danger of environmental pollution.

It does not matter if the intermediate product treatment apparatus is connected to the downstream side of the ultraviolet decomposition unit to selectively add the strong alkali electrolytic water and the strong acid electrolytic water to the polluted liquid or the polluted gas having passed through the ultraviolet decomposition unit, or alternatively, the intermediate product treatment apparatus is connected to an intermediate portion of the ultraviolet decomposition unit to selectively add or spray the strong alkali electrolytic water and the strong acid electrolytic water to the polluted liquid or the polluted gas within the ultraviolet decomposition unit.

There are some cases where the strong alkali electrolytic water and/or the strong acid electrolytic water are or is added to the polluted liquid on the upstream side of the ultraviolet decomposition unit. In addition, when the intermediate product treatment apparatus is connected to the downstream side of the ultraviolet decomposition unit, there are also some cases where the strong alkali electrolytic water and/or strong acid electrolytic water are or is sprayed to the polluted gas within the ultraviolet decomposition unit.

Use of the above configuration may accelerate decomposition of the organic compound by ultraviolet irradiation, and as a result, may reduce a time taken for the treatment. The strong alkali electrolytic water and the strong acid electrolytic water that are added into the ultraviolet decomposition unit are produced at the same time with the strong alkali electrolytic water and the strong acid electrolytic water that are sprayed in the intermediate product treatment apparatus, and as a result, it is possible to hold down an increase in cost.

The ultraviolet decomposition unit may be made up of a reaction vessel having a plurality of ultraviolet lamps set up around a transparent tube that allows the polluted liquid to pass, and reflectors respectively arranged behind the ultraviolet lamps. Accordingly, the ultraviolet rays are irradiated from the plurality of ultraviolet lamps to the polluted liquid, and as a result, the decomposition performance is improved.

There are also some cases where the ultraviolet decomposition unit is made up of a decomposition cell having a ultraviolet lamp arranged therein, and a gas inlet is formed in a peripheral wall of the decomposition cell to allow the polluted gas to blow along a diameter of the decomposition cell. With this arrangement, transfer of the polluted gas along an inner surface of the decomposition cell hardly occurs, and as a result, the polluted gas may stay in the decomposition cell for a longer period of time, while the decomposition performance is improved with the increasing intensity of ultraviolet irradiation.

Incidentally, a low pressure mercury lamp, a middle pressure mercury lamp, a high pressure mercury lamp, an amalgam lamp, a halogen lamp, an Excimer lamp and the like are available for the ultraviolet lamp.

Use of a plurality of reaction vessels connected in series permits a reduction in concentration as the result of efficient decomposition of the organic compound inclusive of high-concentration organic compound. On the other hand, use of the plurality of reaction vessels connected in parallel permits an increase in amount of polluted liquid or polluted gas to be treated.

It is preferable to hang down the plurality of ultraviolet lamps at equal intervals from an upper surface of the decomposition cell so as to realize uniform ultraviolet irradiation to the polluted gas. Since the ultraviolet intensity is inversely proportional to the irradiation distance, the distance between the ultraviolet lamps is limited to 100 mm or less, preferably, 20 mm or less.

Since both of the transparent tube that allows the polluted liquid to pass and a protection tube of the ultraviolet lamp need to prevent ultraviolet rays of relatively short wavelength from being attenuated, it is preferable to use synthetic quartz glass, which permits transmission of 80% or more of ultraviolet rays whose wavelength is not less than 172 nm, as a material of the above tubes.

According to the system for decomposing the organic compound according to the present invention, the harmful organic compound contained in the polluted liquid or the polluted gas is decomposed by irradiation of relatively high energy ultraviolet rays whose wavelength is less than 300 nm, and the unstable intermediate product resulting from decomposition of the organic compound is also decomposed by neutralization with the strong alkali electrolytic water and the strong acid electrolytic water, so that there is less treatment time required, while the need for so much large-scaled apparatus is eliminated.

In addition, some organic compounds that are not completely decomposed by ultraviolet irradiation may be also decomposed up to a lower level by addition of the strong alkali electrolytic water and the strong acid electrolytic water.

Furthermore, the strong alkali electrolytic water- and the strong acid electrolytic water used for neutralization of the intermediate product are harmless to the human body, and therefore, are not in danger of environmental pollution.

BRIEF DESCRIPTION OF THE DRAWINGS

The foregoing and other objects and features of the invention will become apparent from the following description of preferred embodiments of the invention with reference to the accompanying drawings, in which:

FIG. 8 shows the result of measurement on the concentrations of 1,1-DCE, trans-1,2-DCE, cis-1,2-DCE, TCE and PCE (tetrachloroethylene) according to the test 5;

FIG. 9 shows the result of measurement on the concentration of TCE together with the decomposition rate of TCE according to the test 6;

FIG. 10 shows the result of measurement on the concentration of TCE according to the test 7;

FIG. 11 shows the result of calculation on the decomposition rate of TCE according to the test 7;

FIG. 13 shows a change of the concentration of TCE and that of the decomposition rate of TCE in a case where a flow rate was decreased gradually according to the test 8;

FIG. 14 shows a change of the concentration of TCE and that of the decomposition rate of TCE in a case where a flow rate was increased gradually according to the test 8;

FIG. 16 shows the concentration of TCE and the decomposition rate of TCE as the result of the test 9 under the conditions 1;

FIG. 17 shows the concentration of TCE and the decomposition rate of TCE as the result of the test 9 under the conditions 2;

FIG. 18 shows the concentration of TCE and the decomposition rate of TCE as the result of the test 9 under the conditions 3;

FIG. 19 shows the concentration of TCE and the decomposition rate of TCE as the result of the test 9 under the conditions 4;

FIG. 23 shows the result of measurement on the pollution concentration according to the test 10;

FIG. 24 shows the result of measurement on a pH value according to the test 10;

FIG. 25 shows the result of measurement on the pollution concentration according to the test 11;

FIG. 26 shows the result of measurement on a pH value according to the test 11;

FIG. 27 shows a change of the concentration of an organic compound with the passage of time according to the test 12;

FIG. 28 shows a change of the concentration of an intermediate product with the passage of time according to the test 12;

FIG. 29 shows a change of the concentration of an organic compound with the passage of time according to the test 13;

FIG. 30 shows a change of the concentration of an intermediate product with the passage of time according to the test 13;

FIG. 31 shows a change of the concentration of an organic compound with the passage of time according to the test 14;

FIG. 32 shows a change of the concentration of an intermediate product with the passage of time according to the test 14;

FIG. 33 shows a change of the concentration of organic compound with the passage of time according to the test 15;

FIG. 34 shows a change of the concentration of an intermediate product with the passage of time according to the test 15;

FIG. 35 shows a change of the concentration of an organic compound with the passage of time according to the test 16;

FIG. 36 shows a change of the concentration of an intermediate product with the passage of time according to the test 16;

FIG. 37 shows a change of the concentration of an organic compound with the passage of time according to the test 17;

FIG. 38 shows a change of the concentration of an intermediate product with the passage of time according to the test 17;

FIG. 39 shows a change of the concentration of an organic compound with the passage of time according to the test 18;

FIG. 40 shows a change of the concentration of an intermediate product with the passage of time according to the test 18;

FIG. 54 shows the concentration of TCE as the result of measurement according to the test 25, together with the decomposition rate of TCE;

FIGS. 59A and 59B show a change of the concentration of TCE with the passage of time according to the test 27;

FIGS. 60A and 60B show a change of the concentration of PCE with the passage of time according to the test 28;

FIGS. 61A and 61B show a change of the concentration of cis-1,2-DCE with the passage of time according to the test 29; and FIG. 62 shows a change of the concentration of CMMS (chloromethylmethylsulfide) according to the test 30.

DETAILED DESCRIPTION OF THE PREFERRED EMBODIMENTS

Firstly, a system for decomposing a liquid organic compound according to the present invention will be described with reference to FIGS. 1 to 19.

Figure 1:
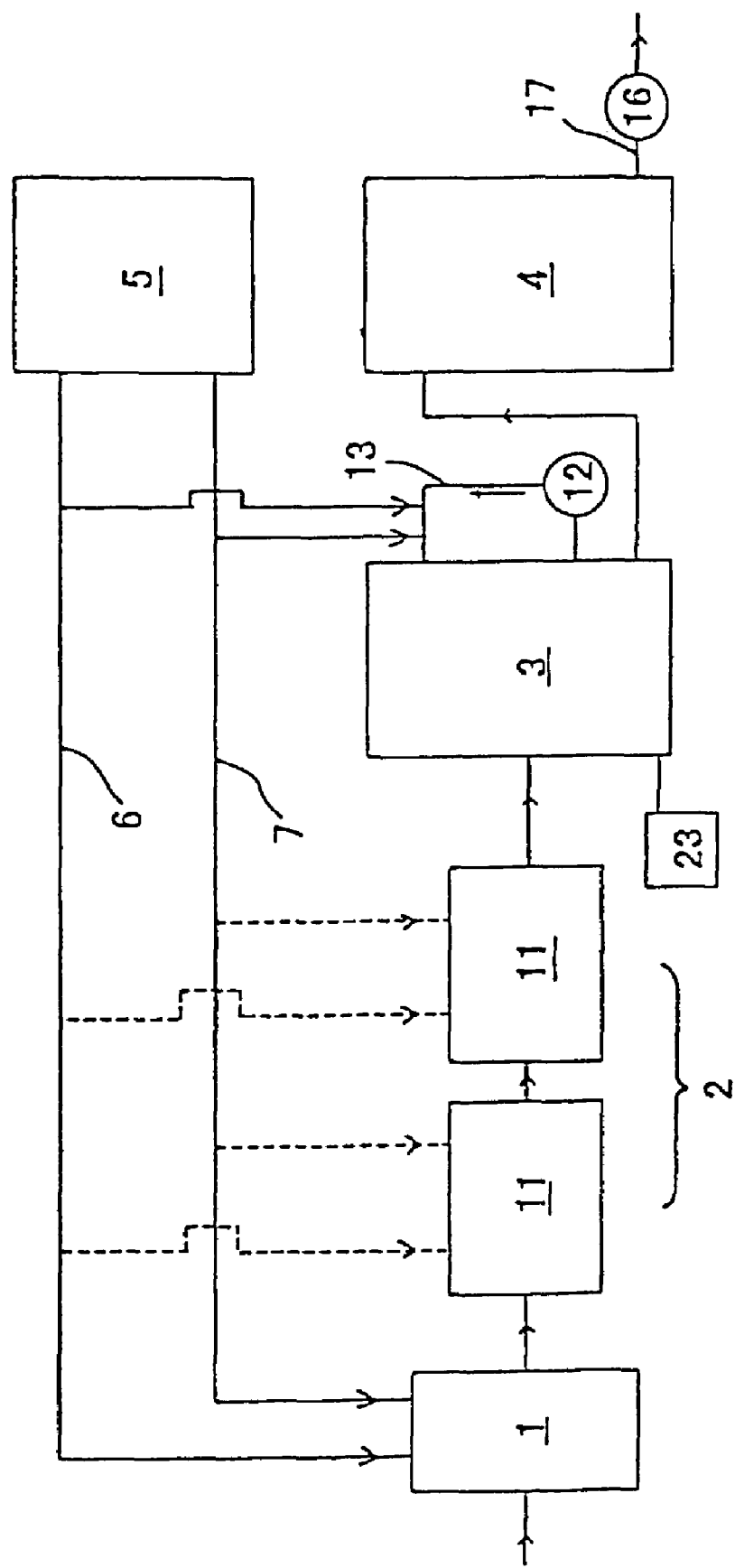
FIG. 1 is a block diagram showing an embodiment of a system for decomposing a liquid organic compound according to the present invention.

The system for decomposing the liquid organic compound is connected to a pumping apparatus (not shown) for pumping up polluted liquid containing an organic compound from the polluted soil and, as shown in FIG. 1, comprises an electrolytic water adding tank 1, into which the polluted liquid is introduced from the pumping apparatus, a ultraviolet decomposition unit 2 connected to the downstream side of the electrolytic water adding tank 1, an intermediate product treatment apparatus 3 connected to the downstream side of the ultraviolet decomposition unit 2, an activated carbon adsorption unit 4 connected to the downstream side of the intermediate product treatment apparatus 3 and an electrolytic water producing apparatus 5.

"Oxylizer Medica CL" (a trade name) manufactured by MIURA DENSHI INC is available for the electrolytic water producing apparatus 5. When water containing water soluble electrolyte such as sodium chloride, potassium chloride and magnesium chloride is electrolyzed by the electrolytic water producing apparatus 5, strong acid electrolytic water is produced from the anode side, while strong alkali electrolytic water is produced from the cathode side.

The strong acid electrolytic water and the strong alkali electrolytic water obtained in this manner are harmless to the human body, and therefore, are not in danger of environmental pollution even if being brought into touch with the polluted liquid as functional water.

The anode side of the electrolytic water producing apparatus 5 and the electrolytic water adding tank 1 are connected together through an acid electrolytic water feed pipe 6 such that the strong acid electrolytic water is added to the polluted liquid within the electrolytic water adding tank 1 by opening a valve (not shown) set up at a portion of connection between the electrolytic water adding tank 1 and the acid electrolytic water feed pipe 6.

In addition, the cathode side of the electrolytic water producing apparatus 5 and the electrolytic water adding tank 1 are connected together through an alkali electrolytic water feed pipe 7 such that the strong alkali electrolytic water is added to the polluted liquid within the electrolytic water adding tank 1 by opening a valve (not shown) set up at a portion of connection between the electrolytic water adding tank 1 and the alkali electrolytic water feed pipe 7.

Figure 2:
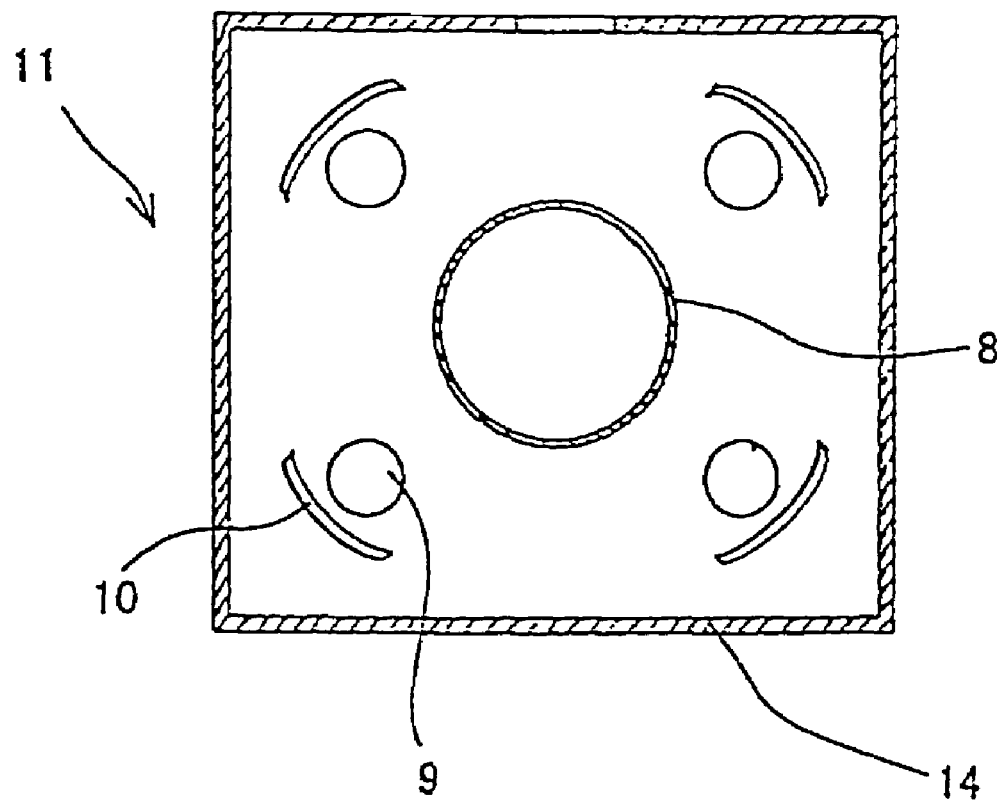
FIG. 2 is a sectional view showing a reaction vessel for use in the decomposing system of FIG. 1.
Figure 3:
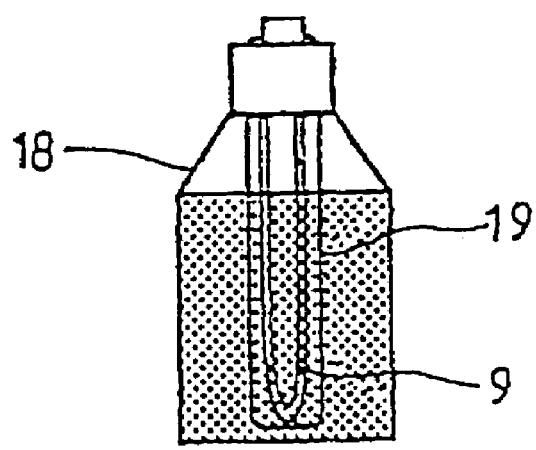
FIG. 3 is a schematic view showing a test apparatus used for tests 1 to 5.

The ultraviolet decomposition unit 2 is composed of two reaction vessels 11 connected in series. As shown in FIG. 2, each reaction vessel 11 has a transparent tube 8 arranged in the center of a light-shielding case 14 and connected to the electrolytic water adding tank 1, four ultraviolet lamps 9 set up around the transparent tube at equal intervals and a reflector 10 arranged behind each ultraviolet lamp 9.

The transparent tube 8 is made of a material such as synthetic quartz glass that permits transmission of 80% or more of ultraviolet rays whose wavelength is not less than 172 nm such that the polluted liquid with the strong acid electrolytic water and/or the strong alkali electrolytic water added in the electrolytic water adding tank 1 may pass through the inside of the transparent tube.

While a low pressure mercury lamp and the like for irradiation of ultraviolet rays whose wavelength is less than 300 nm are available for the ultraviolet lamp 9, it is to be understood that use of ultraviolet rays whose wavelength is limited to 254 nm or less, preferably, 185 nm provides the increased decomposition performance for the organic compound.

An upper part and a lower part of the intermediate product treatment apparatus 3 are connected through a circulation pipe 13 having a pump 12. For this reason, the polluted liquid having flowed into the intermediate product treatment apparatus 3 through the ultraviolet decomposition unit 2 is sent to the upper part of the intermediate product treatment apparatus 3 for circulation in the intermediate product treatment apparatus 3 after being forced upward through the circulation pipe 13 with the pump 12.

In addition, the intermediate product treatment apparatus 3 is equipped with a pH meter 23, wherein a pH value of the polluted liquid having flowed into the intermediate product treatment apparatus 3 may be measured.

Furthermore, the alkali electrolytic water feed pipe 7 and the acid electrolytic water feed pipe 6 are respectively connected to the circulation pipe 13 through valves (not shown) such that the strong alkali electrolytic water and the strong acid electrolytic water are selectively added to the circulating polluted liquid in the intermediate product treatment apparatus 3 by opening the valves according to the pH value of the polluted liquid by measurement with the pH meter 23.

An activated carbon filter is incorporated in the activated carbon adsorption unit 4, wherein a small quantity of organic compound still remaining in the liquid having passed through the intermediate product treatment apparatus. 3 is removed by adsorption.

In addition, a drainage pipe 17 having a pump 16 is connected to the activated carbon adsorption unit 4, so that clean liquid having passed through the activated carbon filter is drained to the outside through the drainage pipe.

The system for decomposing the organic compound is applied as follows.

The polluted liquid containing the organic compound is introduced into the electrolytic water adding tank 1 after being pumped up from the polluted soil, and the strong acid electrolytic water and/or the strong alkali electrolytic water produced by the electrolytic water producing apparatus 5 are or is added to the polluted liquid within the electrolytic water adding tank 1.

The polluted liquid with the electrolytic water added in the electrolytic water adding tank 1 passes successively through the transparent tube 8 of each of two reaction vessels 11 that constitute the ultraviolet decomposition unit 2. The ultraviolet lamps 9 set up around the transparent tube 8 continue to irradiate the ultraviolet rays to the polluted liquid within the transparent tube 8 during the passage of the polluted liquid through the transparent tube.

Then, the organic compound contained in the polluted liquid is decomposed by ultraviolet irradiation. Besides, the reaction of decomposition of the polluted liquid is accelerated in the presence of the strong acid electrolytic water and/or the strong alkali electrolytic water.

The intermediate product resulting from decomposition of the organic compound is contained in the polluted liquid having passed through the ultraviolet decomposition unit 2, so that the polluted liquid that flows into the intermediate product treatment apparatus 3 is supposed to be the polluted liquid containing the intermediate product.

The polluted liquid having flowed into the intermediate product treatment apparatus 3 circulates in the intermediate product treatment apparatus 3 through the circulation pipe 13 for a certain period of time, while the pH value of the polluted liquid is measured with the pH meter 23. On the occasion of passage of the polluted liquid through the circulation pipe 13, the strong alkali electrolytic water or the strong acid electrolytic water is added to the polluted liquid according to the measured pH value, and as a result, the intermediate product contained in the polluted liquid is neutralized.

It is a matter of course that the polluted liquid containing the intermediate product sometimes shows neutrality depending on the kind of organic compounds contained in the polluted liquid. In this case, the strong alkali electrolytic water and the strong acid electrolytic water are simultaneously added to the polluted liquid for decomposition of the intermediate product.

In addition, a small quantity of organic compound still remaining in the liquid having passed through the ultraviolet decomposition unit 2 is also further decomposed by addition of the strong alkali electrolytic water and the strong acid electrolytic water. The liquid having circulated in the intermediate product treatment apparatus 3 for a certain period of time flows into the activated carbon adsorption unit 4 and is then drained to the outside after the intermediate product and the organic compound that still remain in small quantity are removed by adsorption with the activated carbon filter.

Incidentally, as shown by broken lines in FIG. 1, the ultraviolet decomposition unit 2 may be also used as the intermediate product treatment apparatus by connecting the acid electrolytic water feed pipe 6 and the alkali electrolytic water feed pipe 7 also to the reaction vessels 11 through the valves.

In this case, each reaction vessel 11 is equipped with the pH meter 23. Thus, the strong acid electrolytic water and the strong alkali electrolytic water are selectively added to the polluted liquid within the reaction vessels 11 by opening or closing the valves according to the measured pH value of the polluted liquid, and as a result, the intermediate product is neutralized for decomposition. In addition, the strong acid electrolytic water and the strong alkali electrolytic water added to the polluted liquid for the treatment of the intermediate product are supposed to be also applied to decomposition of the organic compound contained in the polluted liquid.

In this place, the intermediate product treatment apparatus 3 may be or may not be installed on the downstream side of the ultraviolet decomposition unit 2.

In addition, it does not matter if the strong alkali electrolytic water or the strong acid electrolytic water is added to the polluted liquid within the intermediate product treatment apparatus 3 after the organic compound contained in the polluted liquid within the ultraviolet decomposition unit 2 is decomposed solely by ultraviolet irradiation without installing the electrolytic water adding tank 1 on the upstream side of the ultraviolet decomposition unit 2.

Furthermore, it is also possible to use an ultraviolet decomposition unit having a plurality of ultraviolet lamps set up in a water tank that reserves the polluted liquid.

A description of examples will now be given as follows.

The test 1 was conducted in the following manner: 500 ml of the polluted liquid containing trichloroethylene (hereinafter referred to as TCE) with the concentration of 7 mg/l was poured in the glass bottle 18, as shown in FIG. 8, and 5% amount of strong acid electrolytic water or distilled water was added. Then, a change of the concentration of TCE was observed for 20 minutes for one case in which the ultraviolet lamp 9, protected by a quartz tube 19, which irradiates ultraviolet rays of 254 nm wavelength, was arranged in the glass bottle 18, and for another case in which the ultraviolet lamp 9, protected by a quartz tube 19, which irradiates ultraviolet rays of 185 nm wavelength, was arranged in the glass bottle 18.

Figures 4A, 4B:
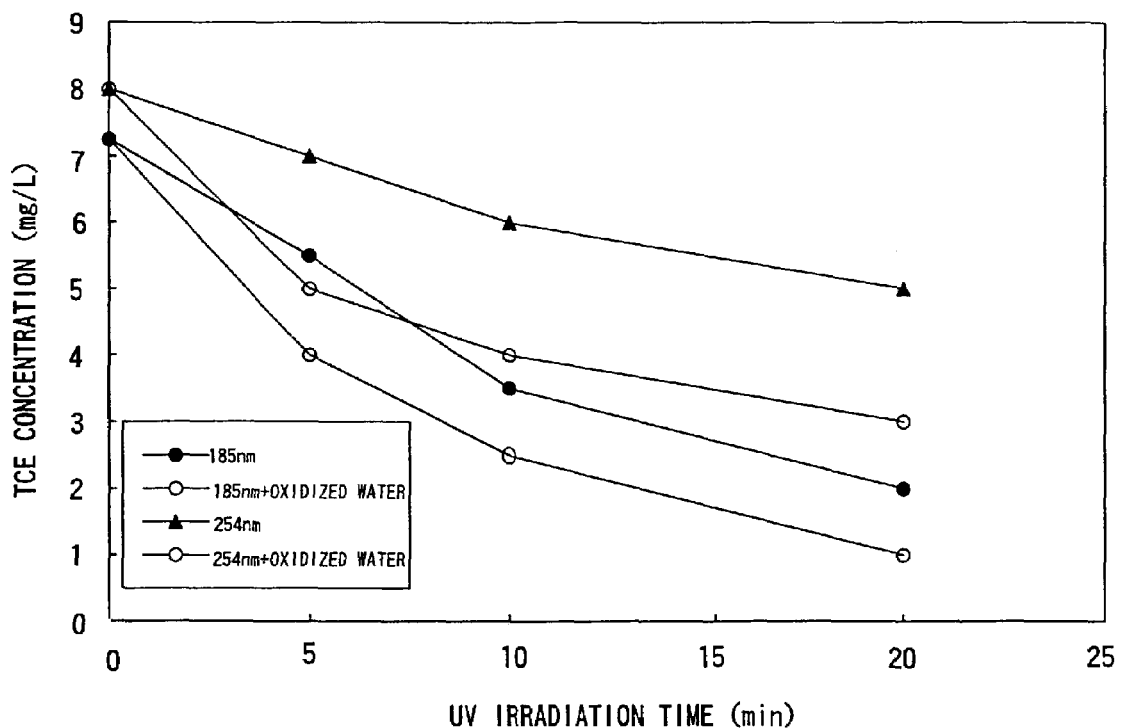
FIGS. 4A and 4B show the result of measurement on the concentration of TCE (trichloroethylene) according to the test 1.

FIGS. 4A and 4B shows the change of the concentration of TCE in each test sample.

Figures 5A, 5B:
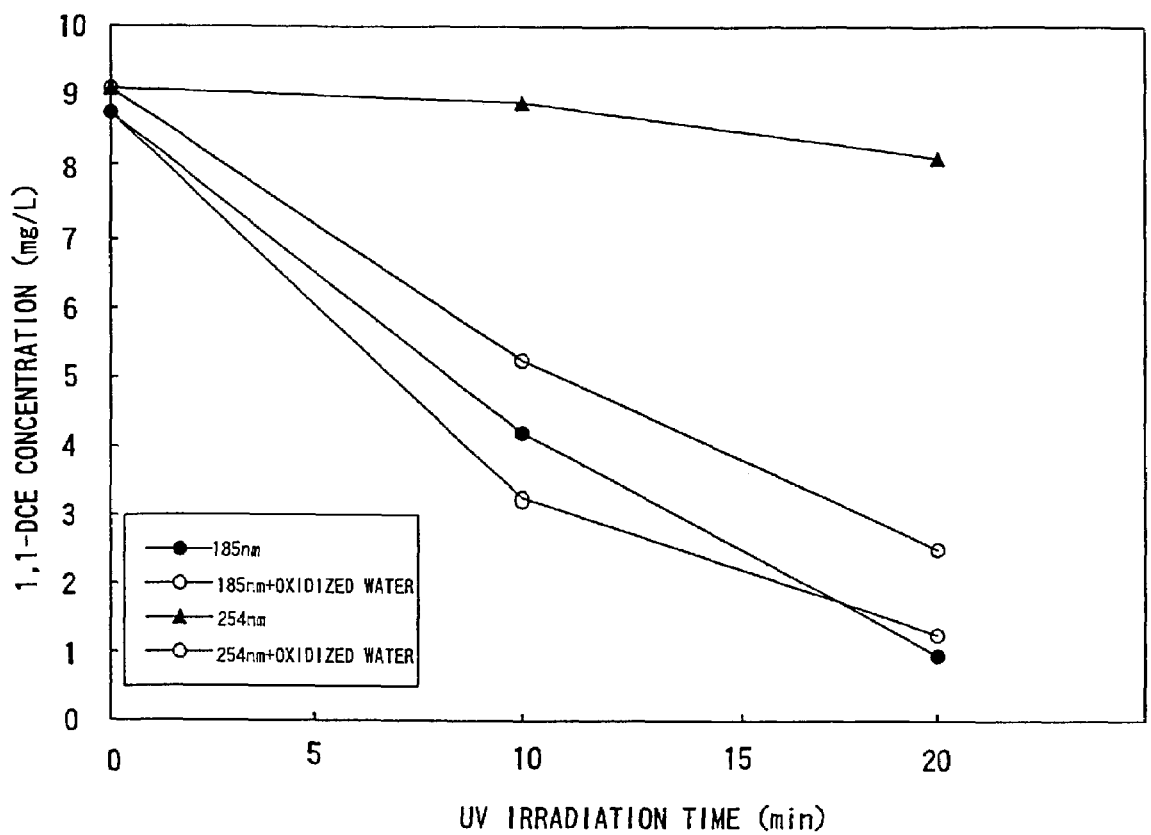
FIGS. 5A and 5B show the result of measurement on the concentration of 1,1-DCE (dichloroethane) according to the test 2.

The test 2 was conducted in the same manner as the test 1, except that 1,1-dichloroethane (hereinafter referred to as 1,1-DCE) was used, instead of TCE. FIGS. 5A and 5B show the result of measurement on the concentration of 1,1-DCE.

Figures 6A, 6B:
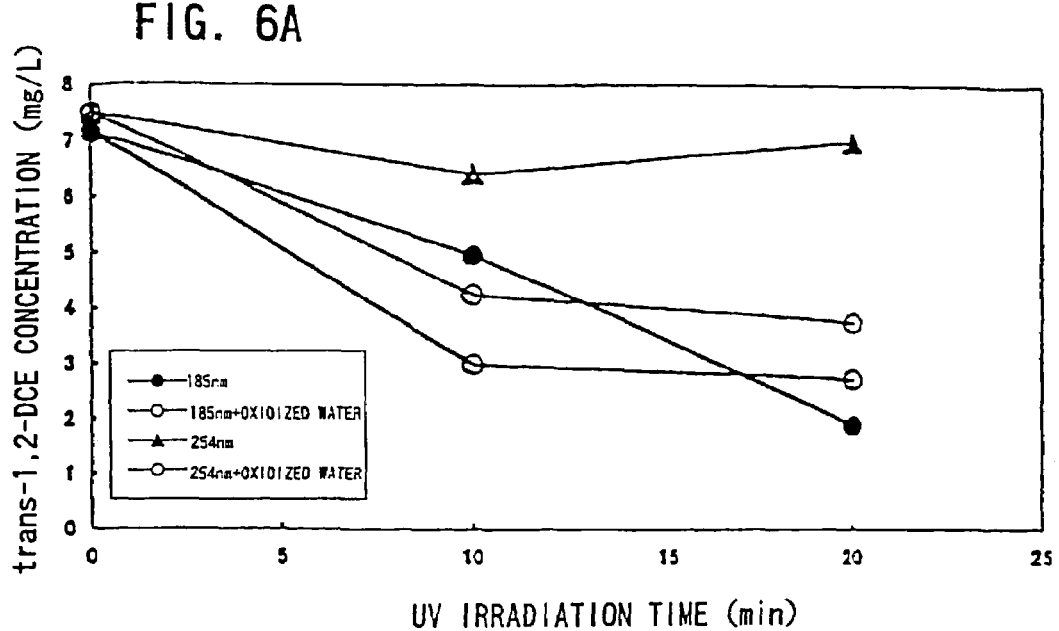
FIGS. 6A and 6B show the result of measurement on the concentration of trans-1,2-DCE according to the test 3.

The test 3 was conducted in the same manner as the test 1, except that trans-1,2-dichloroethane (hereinafter referred to as trans-1,2,DCE) was used, instead of TCE. FIGS. 6A and 6B show the result of measurement on the concentration of trans-1,2-DCE.

Figures 7A, 7B:
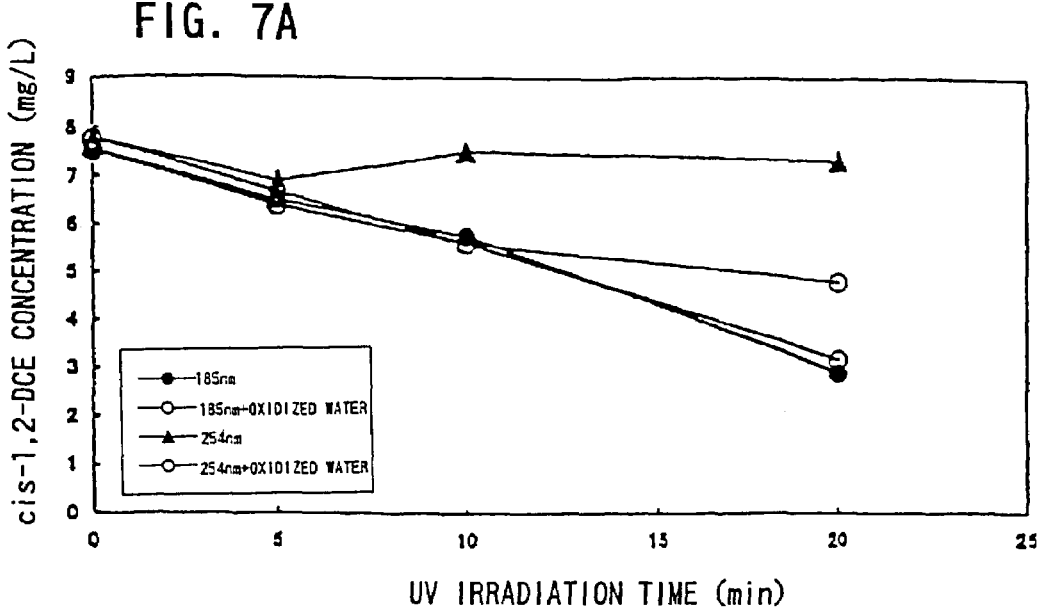
FIGS. 7A and 7B show the result of measurement on the concentration of cis-1,2-DCE according to the test 4.

The test 4 was conducted in the same manner as the test 1, except that cis-1,2-dichloroethane (which will be hereinafter referred to as cis-1,2-DCE) was used, instead of TCE. FIGS. 7A and 7B show the result of measurement on the concentration of cis-1,2-DCE.

The tests 1 to 4 have proven that the organic compound is decomposed by ultraviolet irradiation and as a result, causes a reduction in concentration, and in particular, the decomposition performance is improved with the strong acid electrolytic water added when the ultraviolet rays of longer wavelength are in use.

The test 5 was conducted in the following manner: 500 ml of the polluted liquid containing 1,1-DCE with the concentration of 14.2 mg/l, 500 ml of the polluted liquid containing trans-1,2-DCE with the concentration of 16.5 mg/l, 500 ml of the polluted liquid containing cis-1,2-DCE with the concentration of 14.2 mg/l, 500 ml of the polluted liquid containing TCE with the concentration of 10.8 mg/l and 500 ml of the polluted liquid containing tetrachloroethylene (hereinafter referred to as PCE) with the concentration of 9.8 mg/l, were poured respectively in the test apparatus similar to that used in the test 1, and further 5% amount of strong acid electrolytic water was added. Then, the concentration after the lapse of 20 minutes was examined, respectively, for one case in which ultraviolet rays of 254 nm wavelength was irradiated and another case in which ultraviolet rays of 185 nm wavelength was irradiated. FIG. 8 shows the result of measurement on the concentrations.

The test 5 has proven that the organic compound having a larger number of chlorine atoms is more likely to be decomposed.

The test 6 was conducted by collecting in a quartz test tube 8 ml of the polluted liquid containing TCE, with 5% amount of strong acid electrolytic water, which is 2.53 in pH value, 0.236 mS/m in conductivity and 1046 mV in oxidation reduction potential, added. And then the concentration of TCE before and after ultraviolet irradiation was measured and also the decomposition rate of TCE was found for one case in which a germicidal lamp was used for irradiation of ultraviolet rays whose wavelength is as short as less than 300 nm and for another case in which a Black Light as disclosed in Japanese Patent Application Laid-open No. 2001-170666 was used for irradiation of ultraviolet rays whose wavelength is as long as 300 nm or more. FIG. 9 shows the result of measurement on the concentration of TCE, together with the decomposition rate of TCE. Measurement on the concentration of TCE was conducted using a gas chromatograph after extraction of hexane.

The test 6 has proven that irradiation of ultraviolet rays whose wavelength is as short as less than 300 nm provides extremely higher decomposition performance than that in a case of irradiation of ultraviolet rays whose wavelength is as long as 300 nm or more. It has also proven that irradiation of ultraviolet rays whose wavelength is as short as less than 300 nm for 5 minutes results in a decomposition rate three times as much as that in a case of irradiation of ultraviolet rays whose wavelength is as long as 300 nm or more.

The test 7 was conducted in the same manner as the test 6 to measure the concentration of TCE and also to find the decomposition rate of TCE by irradiating the ultraviolet rays for 30 seconds from the germicidal lamp to the TCE polluted liquid put in the quartz test tube to change the concentration of the strong acid electrolytic water to 1, 3, 5 and 10%, while changing the light intensity to 1.0, 0.4 and 0.2 mW/cm$^2$ by adjusting the distance between the quartz test tube and the germicidal lamp. FIG. 10 shows the concentration of TCE, and FIG. 11 shows the decomposition rate of TCE.

The test 7 has proven that the strong acid electrolytic water with the concentration of 5% provides the highest decomposition rate, and there is almost no effect on the decomposition performance even after the concentration of the strong acid electrolytic water exceeds 5%.

Figure 12:
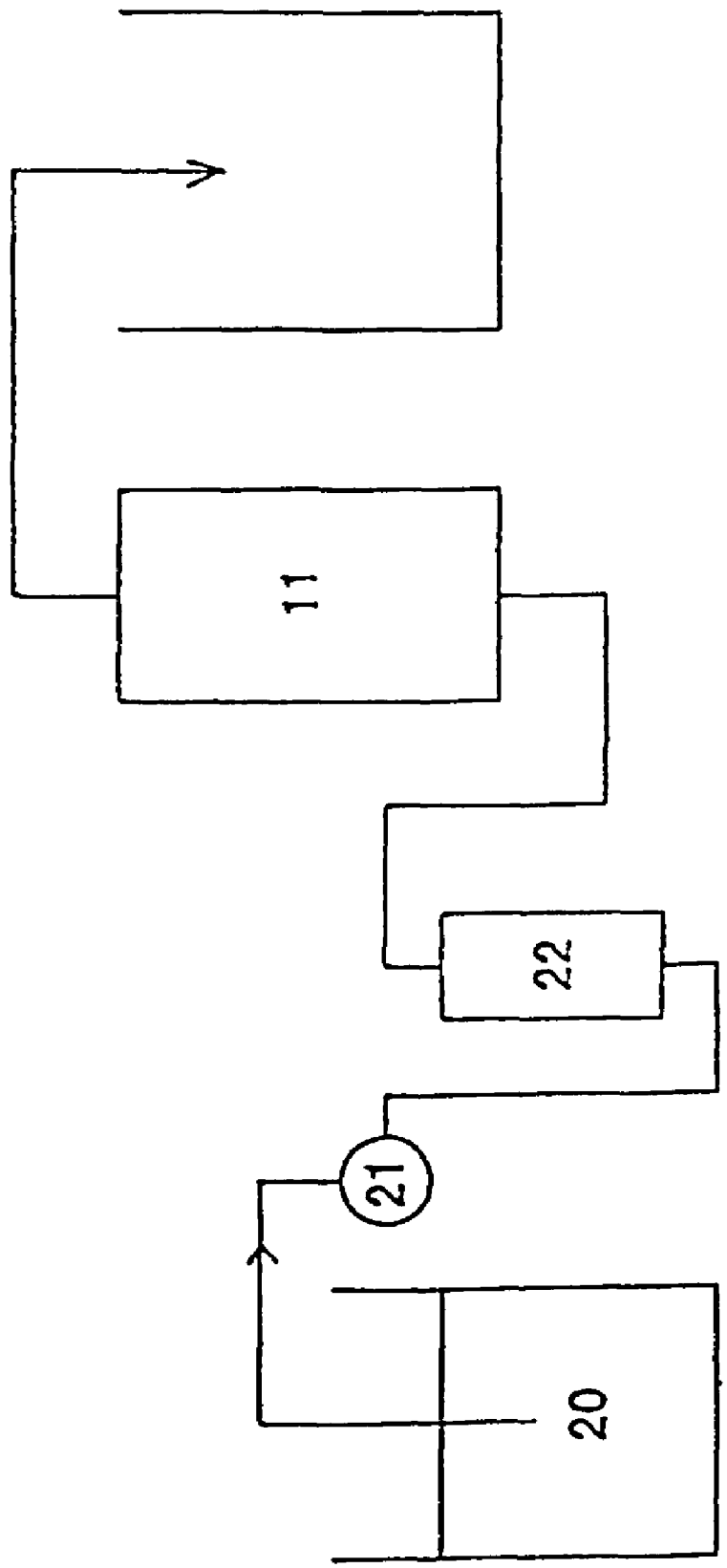
FIG. 12 is a schematic view showing a test apparatus used for the test 8.

FIG. 12 shows a test apparatus used for the test 8. The test apparatus used herein has the reaction vessel 11 connected to the downstream side of a water tank 20 through the pump 21 and a flow meter 22. The reaction vessel 11 is composed of the quartz transparent tube 8 whose inner diameter is 32 mm, the ultraviolet lamps 9 made up of the germicidal lamps and the reflectors 10 arranged on the opposite sides of the quartz transparent tube 8, as shown in FIG. 2. By reserving in the water tank 20 the polluted liquid containing TCE with the concentration of 0.3 mg/l, with 5% amount of strong acid electrolytic water, which is 2.53 in pH value, 0.236 mS/m in conductivity and 1046 mV in oxidation reduction potential, added, the concentration of TCE was measured by changing a flow rate of the liquid to be treated and then the decomposition rate of TCE was found.

FIG. 13 shows the result of measurement when the flow rate was decreased from 8 l/min to 1 l/min, and FIG. 14 shows the result of measurement when the flow rate was increased from 2 l/min to 8 l/min.

The test 8 has proven that the decomposition rate is increased with the decreasing flow rate, and as a result, use of a large number of reaction vessels connected in parallel for flowing the small amount of polluted liquid to each reaction vessel will be enough to increase the amount of liquid to be treated without degrading the decomposition performance.

Figure 15:
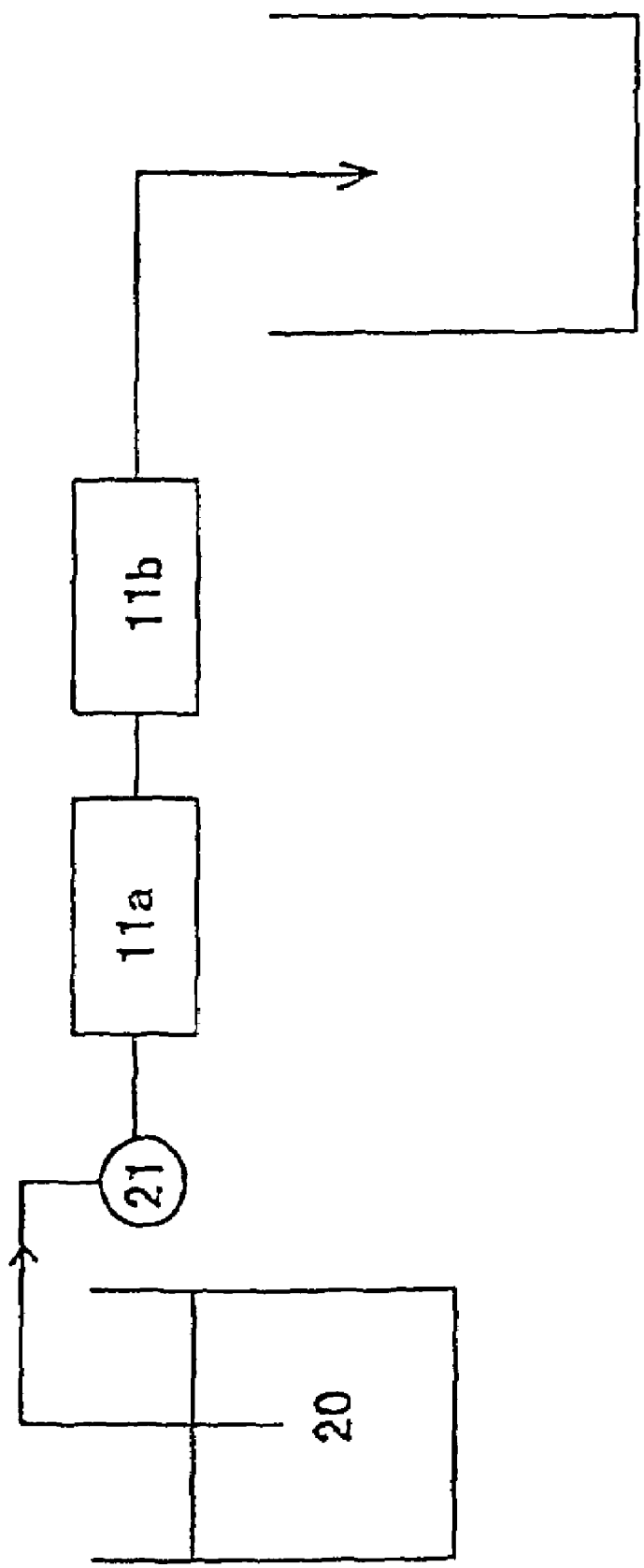
FIG. 15 is a schematic view showing a test apparatus used for the test 9.

FIG. 15 shows a test apparatus used for the test 9. The test apparatus used herein has a first reaction vessel 11a and a second reaction vessel 11b that are connected in series through the pump 21 on the downstream side of the water tank 20. Each of the reaction vessels 11a and 11b is composed of the quartz glass tube 8 whose inner diameter is 10.5 mm and effective length is 60 cm, four ultraviolet lamps 9 constituting 20W germicidal lamps and four reflectors 10 arranged around the quartz glass tube 8, as shown in FIG. 2. The polluted liquid containing TCE, with 5% amount of strong acid electrolytic water, which is 2.53 in pH value, 0.236 mS/m in conductivity and 1046 mV in oxidation reduction potential, added, is reserved in the water tank 20.

Then, the test 9 was conducted to measure the concentration of TCE on the drainage side and also to find the decomposition rate of TCE at the time when all the ultraviolet lamps 9 were turned off, the time when solely the ultraviolet lamps 9 of the first reaction vessel 11a were lighted, the time when solely the ultraviolet lamps 9 of the second reaction vessel 11b were lighted, and the time when the ultraviolet lamps 9 of the first and second reaction vessels 11a and 11b were lighted for a first case where the polluted liquid containing TCE with the concentration of 0.05 mg/l was caused to flow at a flow rate of 800 ml/min, for a second case where the polluted liquid containing TCE with the concentration of 0.03 mg/l was caused to flow at a flow rate of 1000 ml/min, for a third case where the polluted liquid containing TCE with the concentration of 0.3 mg/l was caused to flow at a flow rate of 1000 ml/min and for a fourth case where the polluted liquid containing TCE with the concentration of 3.0 mg/l was caused to flow at a flow rate of 1000 ml/min. FIG. 16 shows the concentration of TCE and the decomposition rate of TCE as the result of the test 9 for the first case, FIG. 17 shows those as the result of the test 9 for the second case, FIG. 18 shows those as the result of the test 9 for the third case, and FIG. 19 shows those as the result of the test 9 for the fourth case.

Incidentally, "a theoretical value" shown in FIGS. 16 to 18 is the value obtained by calculating the decomposition rate of TCE in the first reaction vessel 11a and that of TCE in the second reaction vessel 11b, individually, and then calculating the decomposition rate of TCE after the passage through both the reaction vessels 11a and 11b using the decomposition rates individually obtained.

The test 9 has proven that use of a plurality of reaction vessels 11 connected in series increases the decomposition rate of the organic compound, and its value sufficiently agrees with the theoretical value. In addition, it has also proven that the decomposition performance is increased with the increases of concentration of the organic compound.

A description will now be given of a system for decomposing a gaseous organic compound according to the present invention with reference to FIGS. 20 to 62.

Figure 20:
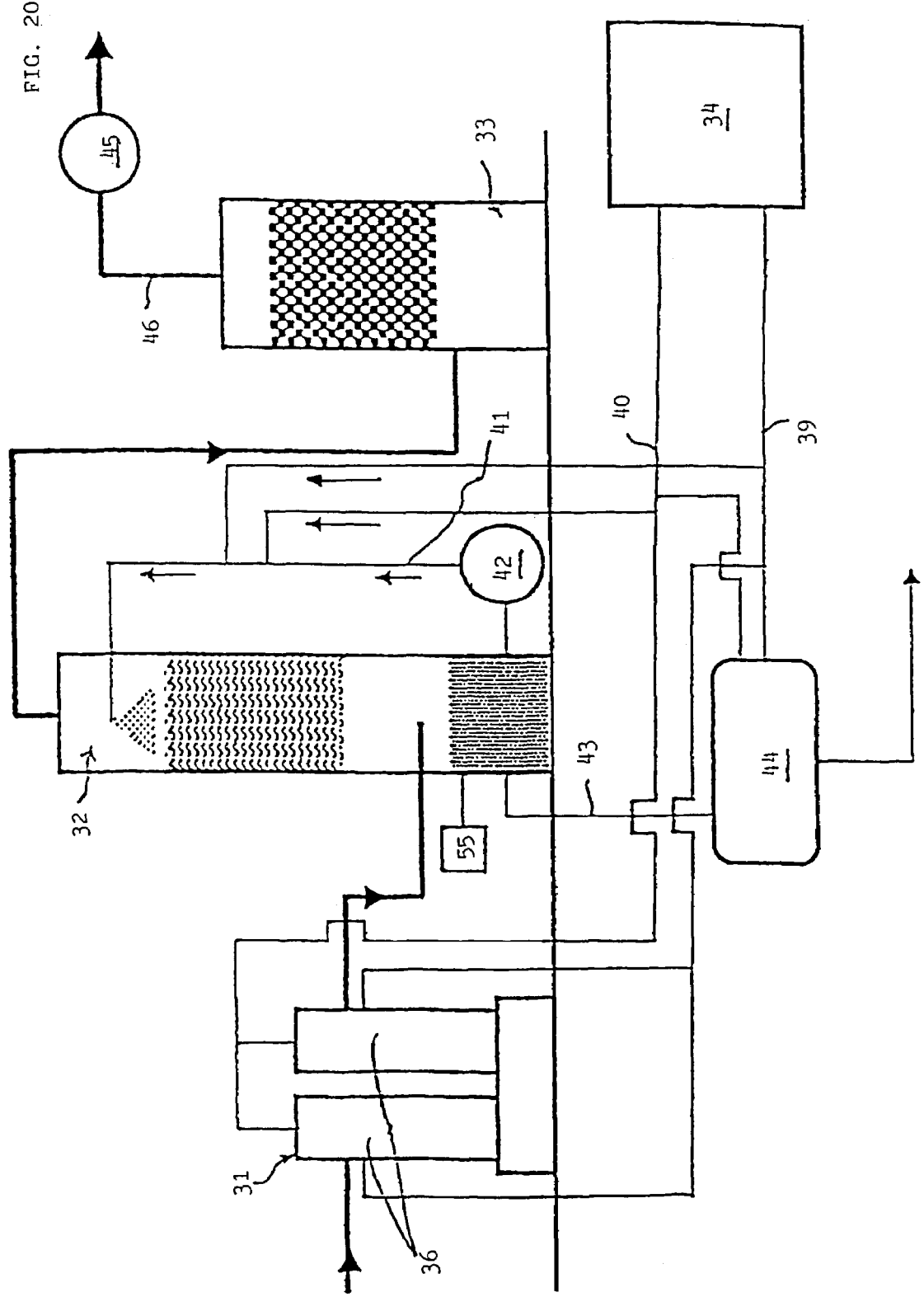
FIG. 20 is a block diagram showing an embodiment of a system for decomposing a gaseous organic compound according to the present invention.

The system for decomposing the gaseous organic compound is connected to a gas suction apparatus for drawing polluted gas containing the organic compound by suction from the polluted soil and, as shown in FIG. 20, comprises a ultraviolet decomposition unit 31, into which the polluted gas is introduced, an intermediate product treatment apparatus made up of a scrubber 32 connected to the downstream side of the ultraviolet decomposition unit 31, an activated carbon adsorption unit 33 connected to the downstream side of the scrubber 32 and an electrolytic water producing apparatus 34.

"Oxylizer Medica CL" (a trade name) manufactured by MIURA DENSHI INC is available for the electrolytic water producing apparatus 34. When water containing water soluble electrolyte such as sodium, chloride, potassium chloride and magnesium chloride is electrolyzed by the electrolytic water producing apparatus 34, strong acid electrolytic water is produced from the anode side, while strong alkali electrolytic water is produced from the cathode side.

The strong acid electrolytic water and the strong-alkali electrolytic water obtained in this manner are harmless to the human body, and therefore, are not in danger of environmental pollution even if being brought into touch with the polluted gas as functional water.

Figure 21:
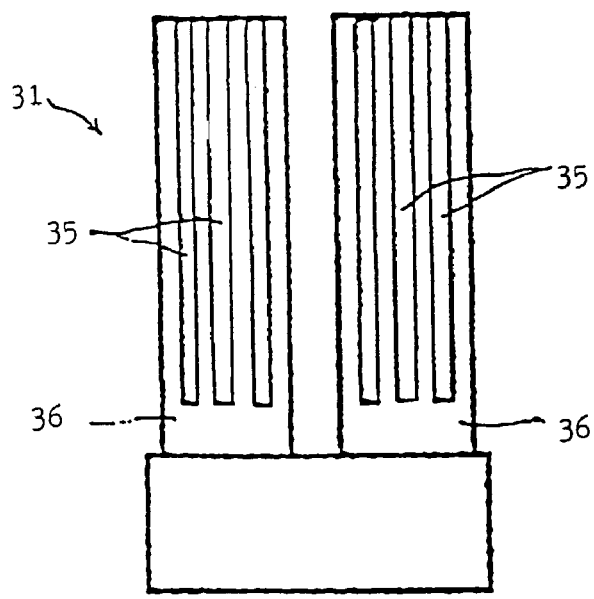
FIG. 21 is a side sectional view showing a decomposition cell for use in the decomposing system of FIG. 20.
Figure 22:
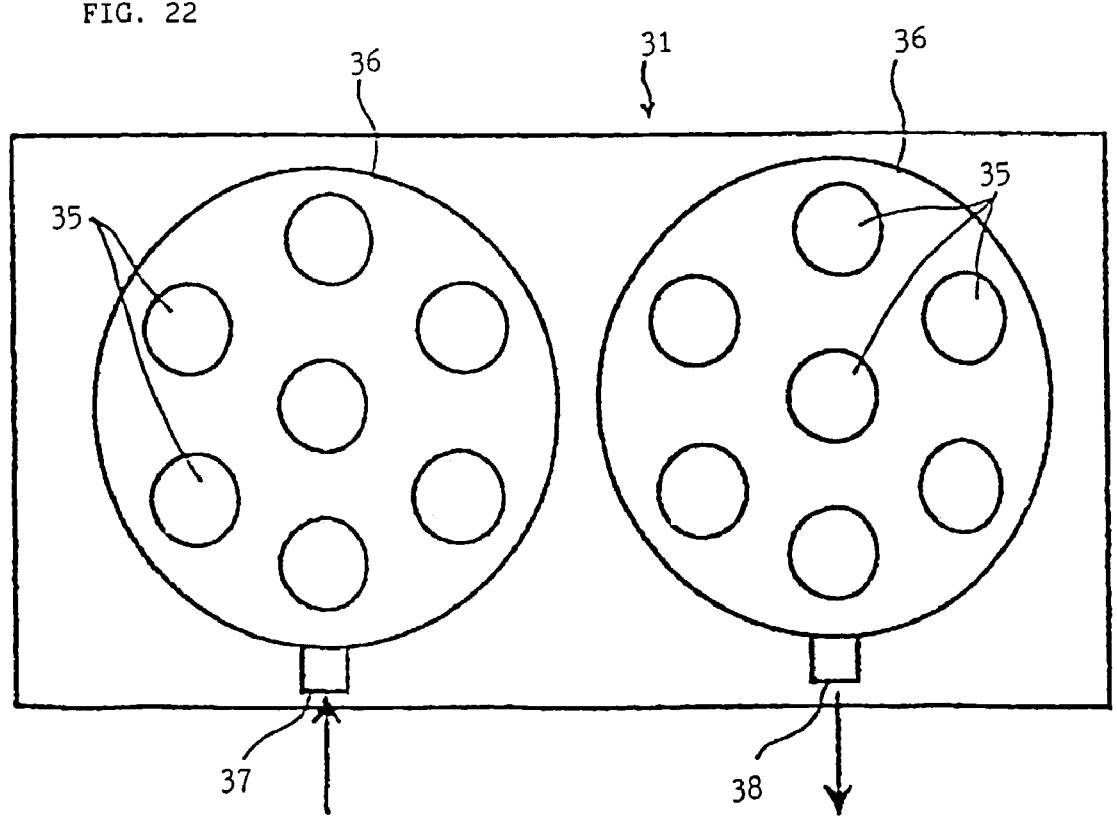
FIG. 22 is a plan sectional view showing the decomposition cell of FIG. 21.
Figure 41:
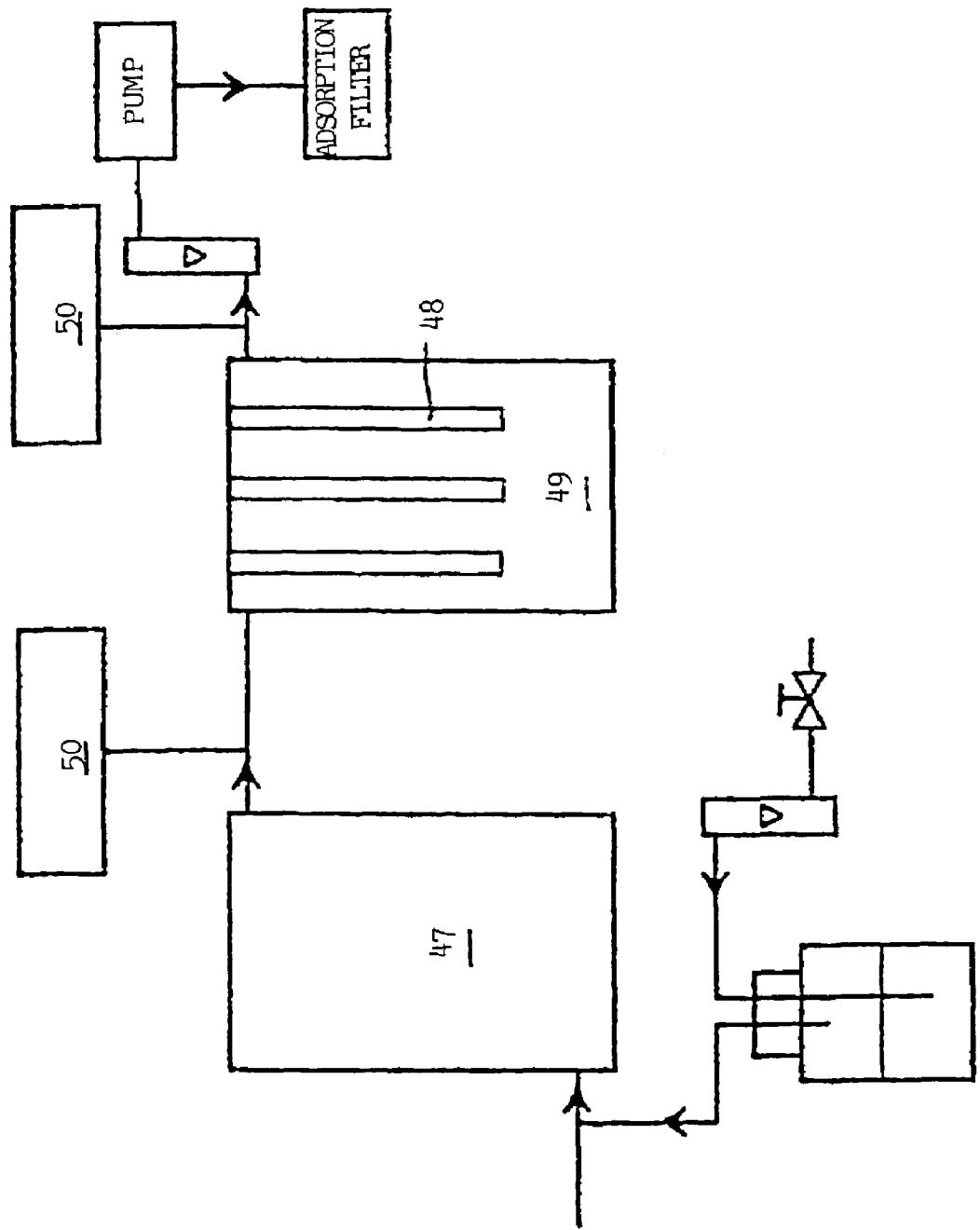
FIG. 41 is a schematic view showing a test apparatus used for tests 19 to 24.

The ultraviolet decomposition unit 31 is composed of two decomposition cells 36, connected in series, arranged inside a stainless steel pipe, and each decomposition cell 36 has a plurality of ultraviolet lamps made up of low pressure mercury lamps 35 (See FIGS. 21 and 22).

Each low pressure mercury lamp 35 is a lamp having a protection tube made of a material such as synthetic quartz glass that permits transmission of 80% or more of ultraviolet rays whose wavelength is 172 nm or more, and irradiates ultraviolet rays whose power consumption is 13W and wavelengths are 254 nm and 185 nm.

In addition, as shown in FIG. 21, the low pressure mercury lamps 35 are hung down from the upper surface of each decomposition cell 36 such that one lamp is placed in the center of the upper surface of each decomposition cell 36, while others are placed at equal intervals along the peripheral edge of the upper surface thereof.

As shown in FIG. 22, the polluted gas is introduced through a gas inlet 37 formed at one diametric end in an upper part of the peripheral wall of one decomposition cell 36, while being extracted through a gas outlet 38 formed at one diametric end in an upper part of the peripheral wall of the other decomposition cell 36.

Then, the anode side of the electrolytic water producing apparatus 34 and each decomposition cell 36 of the ultraviolet decomposition unit 31 are connected together through an acid electrolytic water feed pipe 39 such that the strong acid electrolytic water is sprayed into the decomposition cells 36 by opening a valve (not shown) set up at a portion of connection between each decomposition cell 36 and the acid electrolytic water feed pipe 39.

Furthermore, the cathode side of the electrolytic water producing apparatus 34 and each decomposition cell 36 of the ultraviolet decomposition unit 31 are connected together through an alkali electrolytic water feed pipe 40 such that the strong alkali electrolytic water is sprayed into the decomposition cells 36 by opening a valve (not shown) set up at a portion of connection between each decomposition cell 36 and the alkali electrolytic water feed pipe 40.

The opposite ends of a circulation pipe 41 having a pump 42 are connected to upper and lower parts of the scrubber 32, so that gas having flowed to the lower part of the scrubber 32 through the ultraviolet decomposition unit 31 is transferred to the upper part of the scrubber 32 for circulation in the scrubber 32 after being forced upward through the circulation pipe 41 with the pump 42.

In addition, the scrubber 32 is equipped with a pH meter 55, so that a pH value of the polluted gas having flowed into the scrubber 32 may be measured with the pH meter 55.

Furthermore, the circulation pipe 41 is connected to the acid electrolytic water feed pipe 39 and the alkali electrolytic water feed pipe 40 through valves (not shown), so that the strong acid electrolytic water and the strong alkali electrolytic water are selectively sprayed to the gas circulating in the scrubber 32 by opening the valves according to the pH value of the polluted gas by measurement with the pH meter 55, and as a result, the intermediate product contained in the gas is neutralized for decomposition.

In addition, a drainage neutralization tank 44 is installed in a drainage path 43 extending from the scrubber 32, while the acid electrolytic water feed pipe 39 and the alkali electrolytic water feed pipe 40 are respectively connected to the drainage neutralization tank 44 through valves, so that waste water reserved in the drainage neutralization tank 44 is drained to the outside after being neutralized by adding the strong alkali electrolytic water or the strong acid electrolytic water to the waste water.

An activated carbon filter is incorporated in the activated carbon adsorption unit 33, wherein a small quantity of compound still remaining in the gas having passed through the scrubber 32 is removed by adsorption.

In addition, an exhaust pipe 46 having a pump 45 is connected to the activated carbon adsorption unit 33, so that clean gas having passed through the activated carbon filter is exhausted to the outside through the exhaust pipe.

The system for decomposing the gaseous organic compound is applied as follows.

The polluted gas containing the organic compound is introduced through the gas inlet 37 into the ultraviolet decomposition unit 31 along its diameter after being drawn from the soil by suction, as shown in FIG. 22. Then, the strong acid electrolytic water and/or the strong alkali electrolytic water produced in the electrolytic water producing apparatus 34 are or is brought into touch with the introduced polluted gas by spraying into the decomposition cells 36, while the ultraviolet rays are irradiated to the polluted gas by turning on the low pressure mercury lamps 35.

In consequence, the organic compound contained in the polluted gas is decomposed by ultraviolet irradiation, while the reaction of decomposition is accelerated in the presence of the strong acid electrolytic water and/or the strong alkali electrolytic water.

An intermediate product resulting from decomposition of the organic compound is contained in the polluted gas that is extracted through the gas outlet 38 after having passed through the ultraviolet decomposition unit 31, and hence, the polluted gas which contains the intermediate product flows into the scrubber 32.

The polluted gas having flowed into the scrubber 32 circulates in the scrubber 32 through the circulation pipe 41 for a certain period of time, while the pH value of the polluted gas is measured with the pH meter 55. Then, on the occasion of passage of the polluted gas through the circulation pipe 41, the strong acid electrolytic water or the strong alkali electrolytic water is sprayed to the polluted gas according to the pH value measured with the pH meter 55, and as a result, the intermediate product contained in the polluted gas is neutralized.

There are some cases where the polluted gas containing the intermediate product shows neutrality depending on the kind of organic compounds contained in the polluted gas. In this case, the strong acid electrolytic water and the strong alkali electrolytic water are simultaneously sprayed for decomposition of the intermediate product.

In addition, a small quantity of organic compound still remaining in the gas having passed through the ultraviolet decomposition unit 31 is also further decomposed by spraying of the strong acid electrolytic water or the strong alkali electrolytic water.

A part of the intermediate product which has not decomposed or a part of a by-product resulting from neutralization is drained to the drainage path 43 after being dissolved in the sprayed electrolytic water.

Water drained from the scrubber 32 to the drainage path 43 assumes acidity or alkalinity in most cases, and therefore, needs to be drained to the outside after being neutralized by adding the strong alkali electrolytic water or the strong acid electrolytic water in the drainage neutralization tank 44.

The gas having circulated in the scrubber 32 for a certain period of time flows into the activated carbon adsorption unit 33, and is then exhausted to the outside after the intermediate product and the organic compound that still remains in small quantity are removed by adsorption with the activated carbon filter.

Incidentally, the ultraviolet decomposition unit 31 may be also used as the intermediate product treatment apparatus. In this case, each decomposition cell 36 is equipped with the pH meter 55. Thus, the intermediate product contained in the polluted gas within the ultraviolet decomposition unit 31 is neutralized for decomposition by selectively spraying the strong acid electrolytic water and the strong alkali electrolytic water from the connected acid electrolytic water feed pipe 39 and the connected alkali electrolytic water feed pipe 40 according to the pH value measured with the pH meter 55. In addition, the strong acid electrolytic water and the strong alkali electrolytic water sprayed for neutralization are supposed to be also applied to decomposition of the organic compound contained in the polluted gas. In this place, the scrubber 32 may be or may not be installed on the downstream side of the ultraviolet decomposition unit 31.

In addition, it does not matter if the strong alkali electrolytic water and the strong acid electrolytic water are selectively sprayed into the scrubber 32 after the organic compound contained in the polluted gas within the ultraviolet decomposition unit 31 is decomposed by solely ultraviolet irradiation without connecting the acid electrolytic water feed pipe 39 and the alkali electrolytic water feed pipe 40 to the ultraviolet decomposition unit 31.

A description will now be given of examples as follows.

In the system for decomposing the gaseous organic compound as shown in FIG. 20, the decomposition cell 36 whose diameter is 200 mm and length is 600 mm is used, and seven low pressure mercury lamps 35 were set in each decomposition cell. Then, the polluted gas containing trichloroethylene (hereinafter referred to as TCE) was introduced into the ultraviolet decomposition unit 31, and the strong acid electrolytic water with a pH value in the range of 2.1 to 2.4 was sprayed at a flow rate of 100 ml/min.

In addition, the strong alkali electrolytic water with a pH value of 11.0 was sprayed at a flow rate of 1 l/min to the scrubber 32 to circulate the polluted gas at a flow rate of 12.5 l/min.

The test 10 was conducted in the following manner: The polluted gas containing TCE with the concentration of 50 ppm was caused to blow into the ultraviolet decomposition unit 31 through the gas inlet 37 at a flow rate of 400 l/min, and the concentrations of TCE, hydrogen chloride, phosgene, chlorine and ozone were measured after the lapse of 10 and 30 minutes at each of the following four positions; ① a position immediately before the ultraviolet decomposition unit 31; ② a position between the ultraviolet decomposition unit 31 and the scrubber 32; ③ a position between the scrubber 32 and the activated carbon adsorption unit 33 and ④ a position behind the activated carbon adsorption unit 33. FIG. 23 shows the result of measurement on these concentrations. In addition, FIG. 24 shows the result of measurement on the pH values in the scrubber 32 at a point of time of start of the test and also after the lapse of 10 and 30 minutes.

The test 11 was conducted in the following manner: The polluted gas containing TCE with the concentration of 100 ppm was caused to blow into the ultraviolet decomposition unit through the gas inlet 37 at a flow rate of 400 l/min, and the concentration of TCE, hydrogen chloride, phosgene chlorine and ozone were measured after the lapse of 10 and 30 minutes at each of the above four positions ①, ②, ③ and ④, in a way similar to the case of the test 10, and further the pH values in the scrubber 32 at a point of time of start of the test and also after the lapse of 10 and 30 minutes were measured. FIGS. 25 and 26 show the result of measurement on the concentration of TCE and also the result of measurement on the pH value, respectively.

The tests 10 and 11 have proven that TCE contained in the polluted gas is almost decomposed by ultraviolet irradiation, and the remaining organic compound is also decomposed to provide the extremely low concentration during circulation in the scrubber 32.

In addition, it has also proven that the intermediate product resulting from decomposition of the organic compound by ultraviolet irradiation is almost neutralized in the scrubber 32, and the organic compound and the intermediate product that still remains in extremely small quantity in the gas having passed through the scrubber 32 are completely removed by adsorption with the activated carbon adsorption unit 33.

Furthermore, tests 12 to 18 were conducted in the following manner: The polluted gas of organic compound containing hydrogen sulfide, acetaldehyde, pyridine, ammonia, trimethylamine, acetic acid or methylmercaptan, which are regarded as seven seriously malodorous substances, with the concentration of 10 ppm, are blown into the gas inlet 37 at a flow rate of 400 ml/min, using the ultraviolet decomposition unit 31, and the concentrations of the organic compound was measured at the above four positions ①, ②, ③ and ④, in a manner similar to the case of test 10, and further the concentrations of intermediate products was measured at the above three positions ②, ③ and ④.

More specifically, the test 12 was conducted on decomposition of the polluted gas containing hydrogen sulfide ($H_2S$) to measure the concentration of hydrogen sulfide immediately after start of the test and also after the lapse of 10, 30, 50, and 90 minutes by spraying the strong alkali electrolytic water into the scrubber 32.

FIG. 27 shows a change of the concentration of $H_2S$ with the passage of time, and FIG. 28 shows a change of the concentrations of $SO_2$ and ozone, which are produced as the intermediate product, with the passage of time.

The test 13 was conducted to measure the concentration of acetaldehyde ($CH_3COH$) immediately after start of the test and also after the lapse of 10, 30 and 50 minutes by causing the polluted gas containing acetaldehyde to blow into the ultraviolet decomposition unit through the gas inlet, while spraying the strong acid electrolytic water into the scrubber 32. FIG. 29 shows the concentration of acetaldehyde, and FIG. 30 shows the concentrations of acetic acid ($CH_3COOH$) and ozone, which are supposed to be the expectable intermediate product. Incidentally, though it is expected that acetic acid be produced as the intermediate product, actually the polluted gas having passed through the ultraviolet decomposition unit 31 contains almost no acetic acid as is apparent from FIG. 30, so that it is supposed that there is no need to take decomposition of acetic acid by neutralization into consideration.

The test 14 was conducted to measure the concentration of pyridine ($C_5H_5N$) immediately after start of the test and also after the lapse of 10, 30 and 50 minutes by causing the polluted gas containing pyridine to blow into the ultraviolet decomposition unit through the gas inlet 37, while spraying the strong acid electrolytic water into the scrubber 32. FIG. 31 shows the concentration of pyridine, and FIG. 32 shows the concentrations of NOx and ozone, which are supposed to be the expectable intermediate product.

The test 15 was conducted to measure the concentration of ammonia ($NH_3$) immediately after start of the test and also after the lapse of 10, 30 and 50 minutes by causing the polluted gas containing ammonia to blow into the ultraviolet decomposition unit through the gas inlet 37, while spraying the strong acid electrolytic water into the scrubber 32. FIG. 33 shows the concentration of ammonia, and FIG. 34 shows the concentrations of NOx and ozone, which are supposed to be the expectable intermediate product.

The test 16 was conducted to measure the concentration of trimethylamine ($(CH_3)_3N$) immediately after start of the test and also after the lapse of 10, 30 and 50 minutes by causing the polluted gas containing trimethylamine to blow into the ultraviolet decomposition unit through the gas inlet, while spraying the strong acid electrolytic water into the scrubber 32. FIG. 35 shows the concentration of trimethylamine, and FIG. 36 shows the concentrations of NOx and ozone, which are supposed to be the expectable intermediate product. Incidentally, though it is expected that ammonia be produced as the intermediate product, the concentration of ammonia could not measured because of a difficulty in making discrimination between ammonia and trimetylamine.

In addition, in the tests 14 to 16, though it is expected that NOx be produced as the intermediate product, actually the polluted gas having passed through the ultraviolet decomposition unit 31 contains almost no NOx, so that it is supposed that there is no need to take decomposition of NOx by neutralization into consideration.

The test 17 was conducted to measure the concentration of acetic acid ($CH_3COOH$) immediately after start of the test and also after the lapse of 10, 30 and 50 minutes by introducing the polluted gas containing the acetic acid into the ultraviolet decomposition unit through the gas inlet 37, while spraying the strong alkali electrolytic water into the scrubber 32. FIG. 37 shows the concentration of acetic acid, and FIG. 38 shows the concentration of ozone produced as the intermediate product.

The test 18 was conducted to measure the concentration of methylmercaptan ($CH_3SH$) immediately after start of the test and also after the lapse of 10, 30 and 50 minutes by introducing the polluted gas containing the methylmercaptan into the ultraviolet decomposition unit through the gas inlet 37, while spraying the strong alkali electrolytic water into the scrubber 32. FIG. 39 shows the concentration of methylmercaptan, and FIG. 40 shows the concentration of $SO_2$, $H_2S$ and ozone, which are supposed to be the expectable intermediate product. Incidentally, even in this test 18, no $H_2S$, which was supposed to be the expectable intermediate product, was detected from the gas having passed through the ultraviolet decomposition unit 31.

The tests 12 to 18 have proven that almost all the malodorous substances may also be decomposed by the decomposing system according to the present invention.

The test 19 was conducted using a test apparatus composed of a test cell 49 with a capacity of 180 l that is installed on the downstream side of a gas mixing tank 47 and is equipped with ten ultraviolet lamps 48 hung down from the upper surface of the test cell, and VOC monitors 50 respectively installed on the upstream and downstream sides of the test cell 49. With this test apparatus, ultraviolet effects on decomposition of the organic compound was examined by continuously feeding to the test apparatus the polluted gas containing TCE with the concentration of 50 ppm at a flow rate of 100 l/min, 200 l/min, 300 l/min and 400 l/min.

Figures 42, 43:
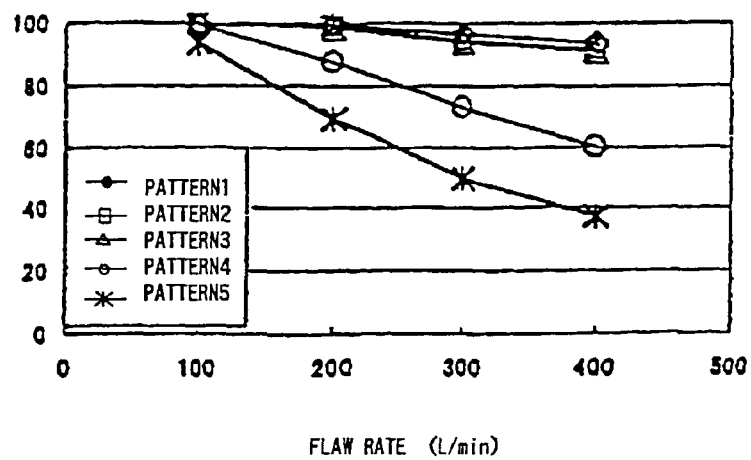
FIG. 42 shows the result of measurement on the concentration of TCE according to the test 19.
FIG. 43 shows the result of calculation on the decomposition rate of TCE according to the test 19.

Then, FIG. 42 shows the result of measurement on the concentration of TCE on the upstream and downstream sides of a ultraviolet decomposition unit 2' according to a pattern 1 where ten ultraviolet lamps 48 were lighted, a pattern 2 where seven ultraviolet lamps 48 were lighted, a pattern 3 where six ultraviolet lamps 48 were lighted, a pattern 4 where three ultraviolet lamps 48 were lighted and a pattern 5 where one ultraviolet lamp 48 was lighted. FIG. 43 shows the decomposition rate of TCE obtained by the expression of (1−downstream concentration/upstream concentration)×100%.

Figures 44, 45:
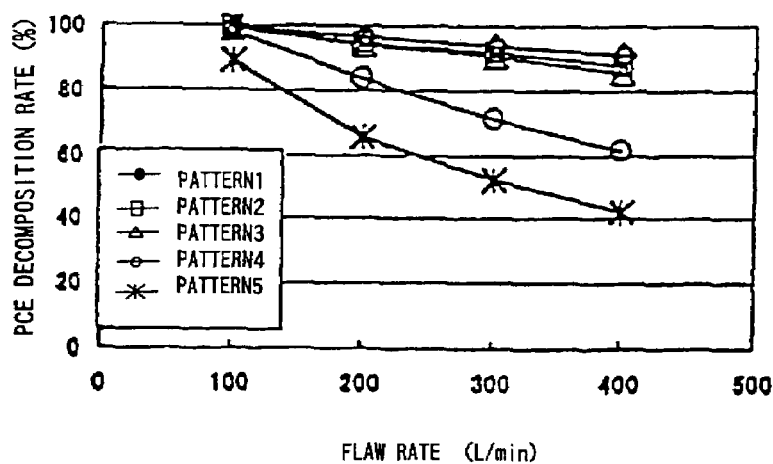
FIG. 44 shows the result of measurement on the concentration of PCE according to the test 20.
FIG. 45 shows the result of calculation on the decomposition rate of PCE according to the test 20.

The test 20 was conducted in the same manner as the test 19, except that tetrachloroethylene (hereinafter referred to as PCE) was used, instead of TCE. FIG. 44 shows the result of measurement on the concentration of PCE, and FIG. 45 shows the decomposition rate of PCE.

Figures 46, 47:
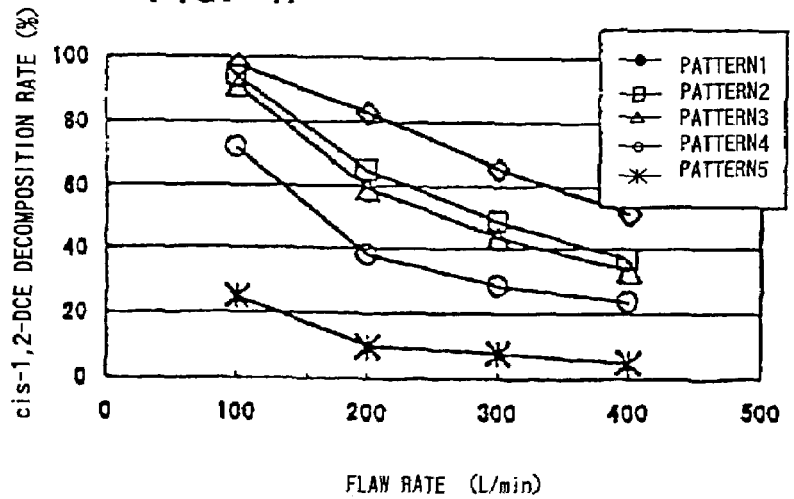
FIG. 46 shows the result of measurement on the concentration of cis-1,2-DCE according to the test 21.
FIG. 47 shows the result of calculation on the decomposition rate of cis-1,2-DCE according to the test 21.

The test 21 was conducted in the same manner as the test 19, except that cis-1,2-dichloroethylene (hereinafter referred to as cis-1,2-DCE) was used, instead of TCE. FIG. 46 shows the result of measurement on the concentration of cis-1,2-DCE, and FIG. 47 shows the decomposition rate of cis-1,2-DCE.

Figures 48, 49:
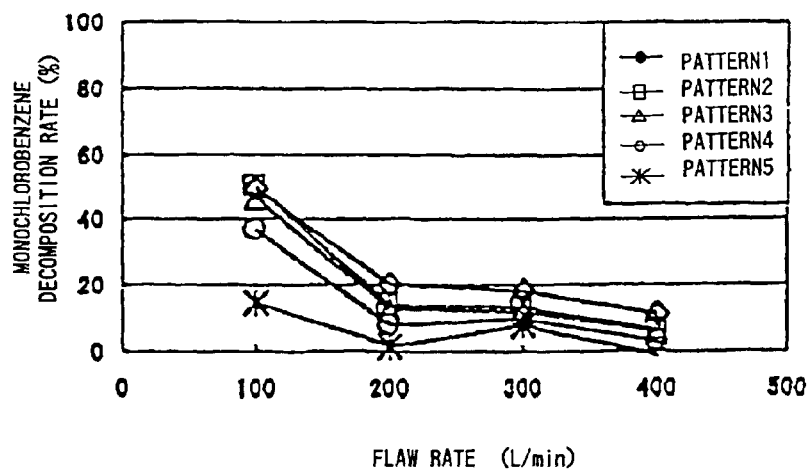
FIG. 48 shows the result of measurement on the concentration of monochlorobenzene according to the test 22.
FIG. 49 shows the result of calculation on the decomposition rate of monochlorobenzene according to the test 22.

In addition, the test 22 was conducted in the same manner as the test 19, except that monochlorobenzene was used, instead of TCE. FIG. 48 shows the result of measurement on the concentration of monochlorobenzene, and FIG. 49 shows the decomposition rate of monochlorobenzene.

Figures 50, 51:
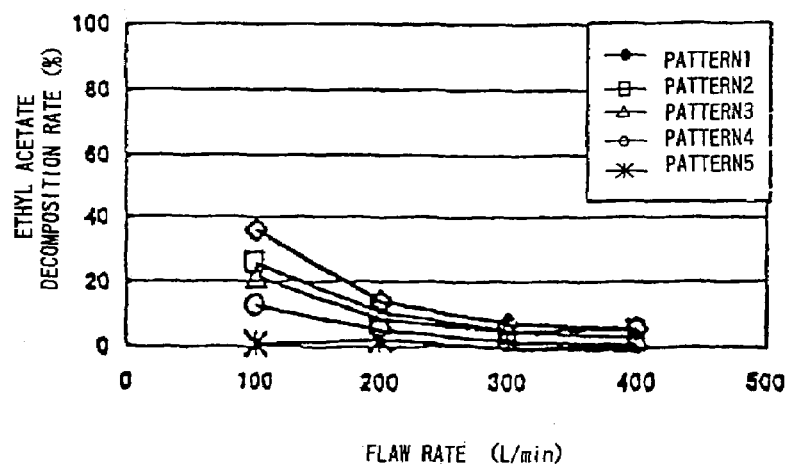
FIG. 50 shows the result of measurement on the concentration of ethyl acetate according to the test 23.
FIG. 51 shows the result of calculation on the decomposition rate of ethyl acetate according to the test 23.

The test 23 was conducted in the same manner as the test 19, except that ethyl acetate was used, instead of TCE. FIG. 50 shows the result of measurement on the concentration of ethyl acetate, and FIG. 51 shows the decomposition rate of ethyl acetate.

Figures 52, 53:
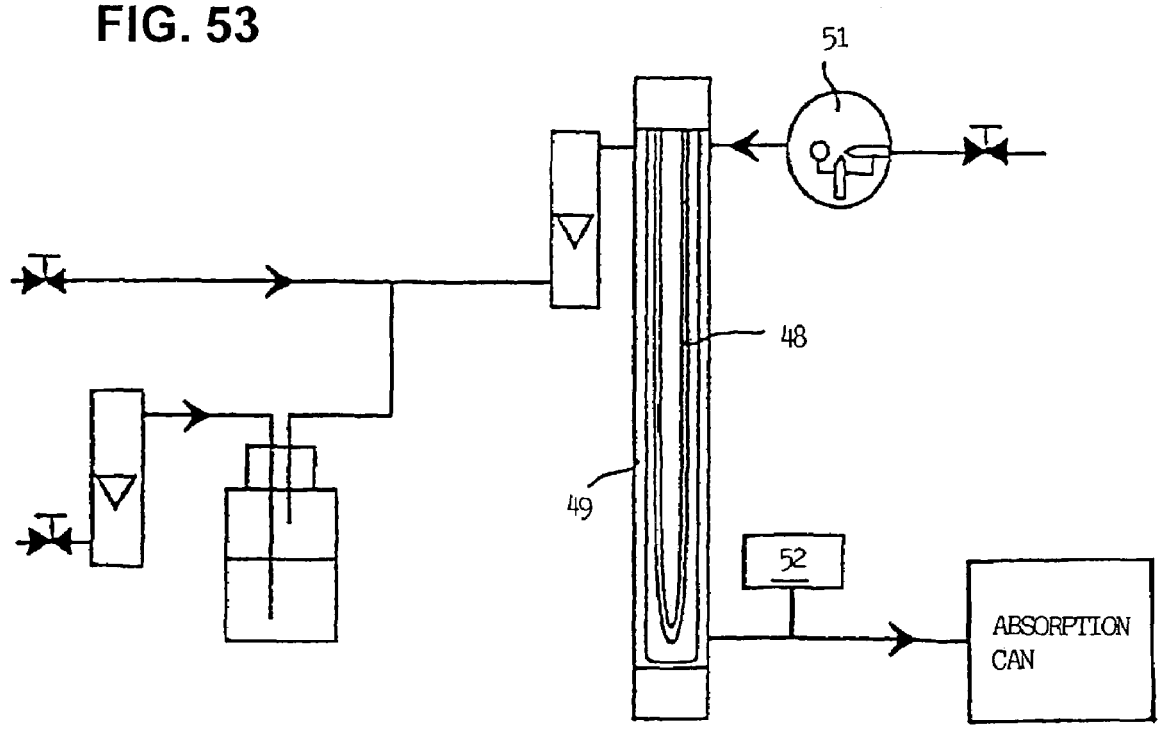
FIG. 52 shows the result of measurement on the concentration of toluene according to the test 24.
FIG. 53 is a schematic view showing a test apparatus used for the test 25.

The test 24 was conducted to measure the concentration of toluene by feeding gas containing toluene, instead of TCE, with the concentration of 50 ppm at a flow rate of 100 l/min to a test apparatus similar to that used for the test 19. FIG. 52 shows the result of measurement on the concentration of toluene.

The tests 19 to 24 have proven that the ultraviolet decomposition rate is increased with the decreases of flow rate of the test samples, and tetrachloroethylene having a large number of chlorine atoms is more likely to be decomposed by ultraviolet irradiation, whereas ethyl acetate and toluene that contain no chlorine are hardly to be decomposed by ultraviolet irradiation.

The test 25 was conducted to examine the effects on acceleration of decomposition in a case of spraying the strong alkali electrolytic water, the strong acid electrolytic water and a mixture thereof before ultraviolet irradiation. For the test 25, an ultraviolet lamp 48 for irradiation of ultraviolet rays whose wavelength is 254 nm at output of 30W was installed in the test cell 49 whose inner diameter is 120 mm and height is 1300 mm, as shown in FIG. 53, and a mixture of TCE gas with diluting air was introduced into a test cell 49 at a flow rate of 3 l/min. Then, spraying either the strong acid electrolytic water, the strong alkali electrolytic water, a mixture of strong acid electrolytic water and strong alkali electrolytic water at the ratio of 1 to 1 and tap water into the test cell 49 at a flow rate of 10 l/min using an atomizer 51, and then repeatedly turning on and off the ultraviolet lamp 48 after stabilization of the concentration of TCE, the test 25 was conducted to measure the concentration of TCE in the gas extracted from the test cell through an extraction port 52 formed in a portion on the downstream side of the test cell at an interval of 10 minutes. FIG. 54 shows the result of measurement on the concentration of TCE, together with the decomposition rate of TCE.

The test 25 has proven that use of the strong acid electrolytic water, the strong alkali electrolytic water and the mixture of strong acid electrolytic water and strong alkali electrolytic water for spraying apparently increases the decomposition performance more than that in the case where tap water is sprayed.

Figure 55:
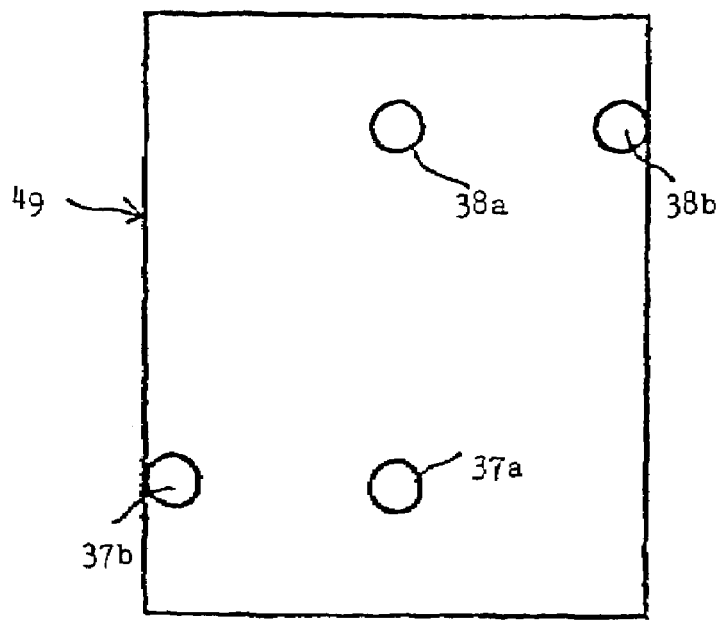
FIG. 55 is a side sectional view showing a test cell used for the test 26.
Figure 56:
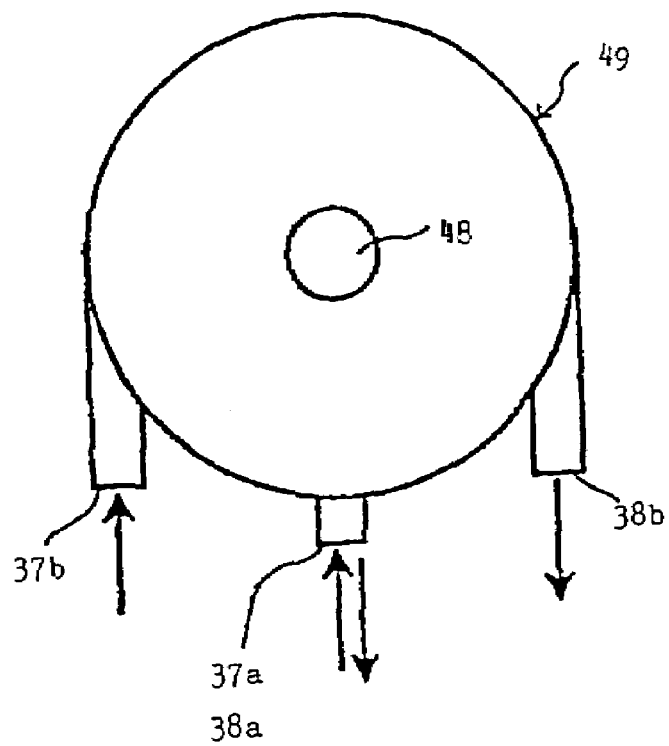
FIG. 56 is a plan sectional view showing the test cell used for the test 26.

FIGS. 55 and 56 show a test apparatus used for the test 26. The test apparatus used herein has a test cell 49 having an exchangeable ultraviolet lamp 48 hung down from an upper surface of the test cell 49. In a lower part of the peripheral wall of the test cell 49, there are a first gas inlet 37a for introducing gas along a diameter, and a second gas inlet 37b for introducing gas along a tangent line. In an upper part of the peripheral wall of the test cell 49, there are a first gas outlet 38a for extracting gas along a diameter and a second gas outlet 38b for extracting gas along a tangent line.

Figure 57:
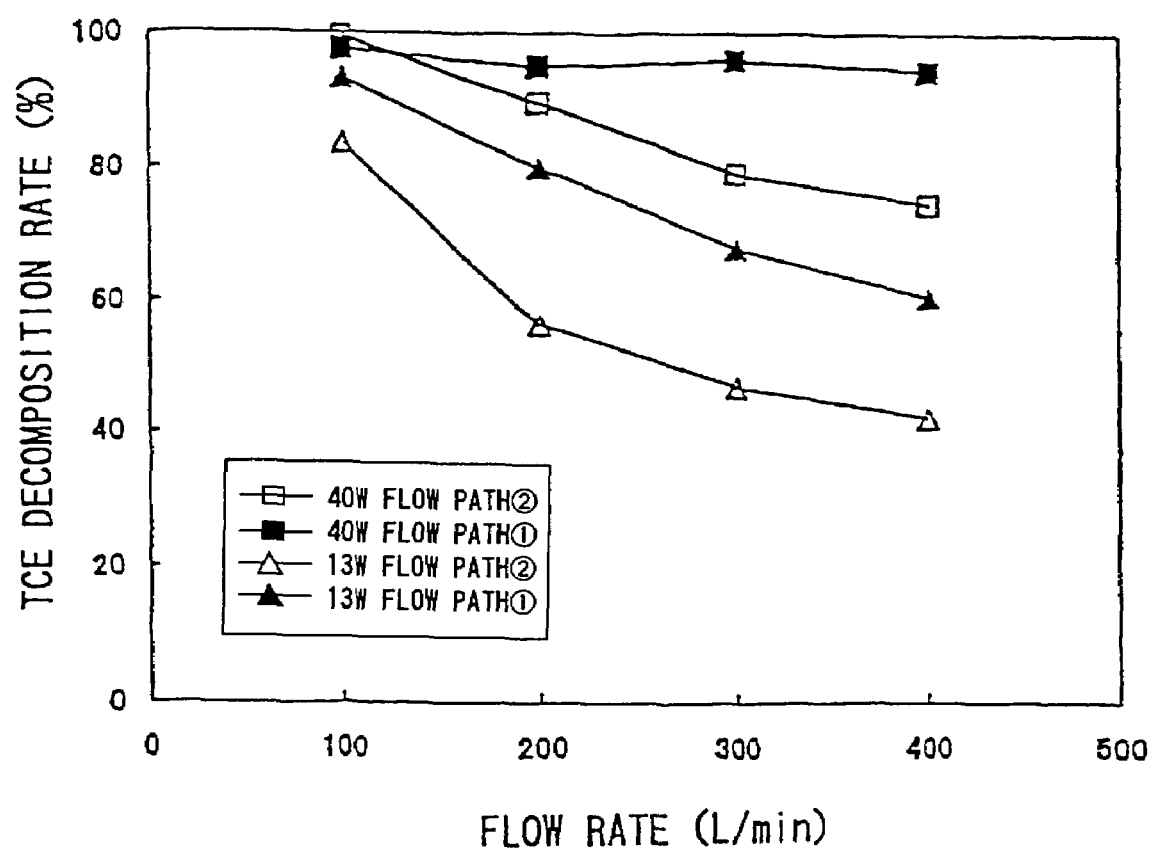
FIG. 57 shows the decomposition rate of TCE according to the test 26.

Then, using the ultraviolet lamp 48 with a protection tube which irradiates ultraviolet rays of 185 nm wavelength and also ultraviolet rays of 254 nm wavelength at output of 13W, or alternatively, using the ultraviolet lamp 48 without a protection tube which irradiates ultraviolet rays of 185 nm wavelength and also ultraviolet rays of 254 nm wavelength at output of 40W, the test 26 was conducted to measure the concentration of TCE on the upstream and downstream sides of the test cell 49 and to find the decomposition rate of TCE for one case where gas containing TCE with the concentration of 50 ppm was caused to flow at a flow rate of 100 l/min, 200 l/min, 300 l/min and 400 l/min through a flow path ① extending from the first gas inlet 37a to the first gas outlet 38a and for another case where the gas was caused to flow through a flow path ② extending from the second gas inlet 37b to the second gas outlet 38b. FIG. 57 shows the result of the test 26.

The test 26 has proven that introduction of the polluted gas into the cell along the diameter thereof toward the cross sectional center provides the decomposition performance higher than that in case of introducing the polluted gas in the tangential direction.

The reason is because introduction of the gas in the tangential direction of the cell causes a flow of the gas along the wall surface of the cell, so that the ultraviolet intensity is decreased, while the time the gas stays in the cell is reduced.

Figure 58:
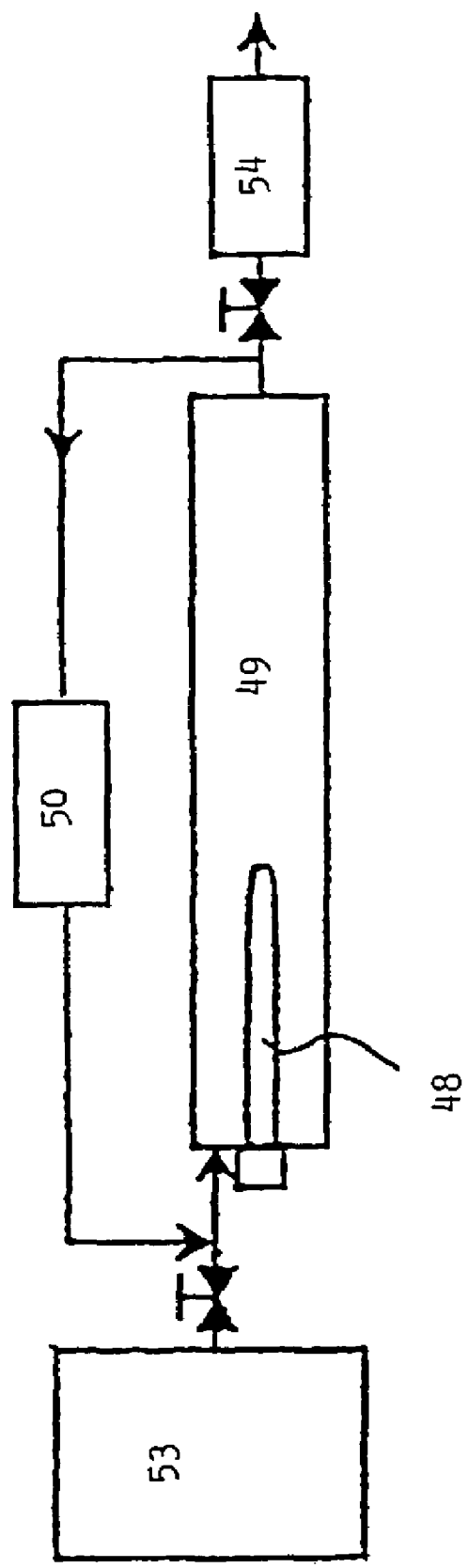
FIG. 58 is a schematic view showing a test apparatus used for tests 27 to 29.

FIG. 58 shows a test apparatus used for tests 27 to 29. The test apparatus used herein has a test gas-loaded Tedlar bag 53 connected to a test cell 49 whose inner diameter is 45 mm, length is 500 mm and capacity is 800 ml, and in which the ultraviolet lamp 48 is housed. Then, gas was introduced into the test cell 49 by suction with a pump 54 until the concentration of the gas reaches a certain value. Then, the tests were conducted to observe a change of the concentration of gas using a VOC sensor 50 by lighting the ultraviolet lamp 48 for 20 minutes.

The tests were conducted for one case where the initial concentration of gas was 10 ppm and also for another case where the initial concentration of gas was 100 ppm, by using GLS6UN (manufactured by TOSHIBA INC) for irradiation of ultraviolet rays whose wavelength is 185 nm and those whose wavelength is 254 nm, GLS6UJ (manufactured by TOSHIBA INC) for irradiation of ultraviolet rays whose wavelength is 254 nm and Black Light (manufactured by MIYATA ELEVAM INC) for irradiation of ultraviolet rays whose wavelength is not less than 300 nm as the ultraviolet lamp 48.

More specifically, the test 27 was conducted using trichlorotethylene as the test gas. FIG. 59A shows the concentration of TCE for the case where the initial concentration of gas was 10 ppm, and FIG. 59B shows the concentration of TCE for the case where the initial concentration of gas was 100 ppm.

The test 28 was conducted using tetrachloroethylene as the test gas. FIG. 60A shows the concentration of PCE for the case where the initial concentration of gas was 10 ppm, and FIG. 60B shows the concentration of PCE for the case where the initial concentration of gas was 100 ppm.

The test 29 was conducted using cis-1,2 dichloroethylene as the test gas. FIG. 61A shows the concentration of cis-1, 2-DCE for the case where the initial concentration of gas was 10 ppm, and FIG. 61B shows the concentration of cis-1,2-DCE for the case where the initial concentration of gas was 100 ppm.

The tests 27 to 29 have proven that use of the ultraviolet rays whose wavelength is not less than 300 nm causes only a change of concentration to a value almost as much as a measured value of the blank, resulting in no decomposition of the organic compound.

The test 30 was conducted to verify the possibility of the ultraviolet effects on decomposition of yperite $((ClCH_2CH_2)_2S)$ used as toxic gas for chemical weapon. For the test 30, an ultraviolet lamp for irradiation of ultraviolet rays whose wavelength is 185 nm and those whose wavelength is 254 nm was installed in a Duran bottle of 500 ml, and a Tedlar bag containing chloromethylmethylsulfide $(ClCH_2SCH_3$, which will be hereinafter referred to as CMMS) as a yperite pseudo agent was connected to the Duran bottle to replace air within the Duran bottle with CMMS by suction with a pump separately connected to the Duran bottle.

Thereafter, the ultraviolet lamp was turned on, and then the concentration of CMMS was measured. FIG. 62 shows the result of measurement on the concentration of CMMS.

The test 30 has proven that the yperite pseudo agent is also decomposed as much as half by ultraviolet irradiation, although the decomposition speed is supposed to be not so high.

What is claimed is:

1. A system for decomposing an organic compound, comprising:

an ultraviolet decomposition unit for introducing polluted gas containing organic compounds and irradiating the polluted gas introduced with ultraviolet rays at a wavelength of less than 300 nm to decompose the organic compounds;

an electrolytic water producing apparatus for producing strong alkali electrolytic water and strong acid electrolytic water and feeding them into an alkali electrolytic water feed pipe and an acid electrolytic water feed pipe, respectively; and an intermediate product treatment apparatus for introducing the polluted gas processed in, and discharged from, said ultraviolet decomposition unit, and for selectively spraying strong alkali electrolytic water and strong acid electrolytic water, fed through the alkali electrolytic water feed pipe and the acid electrolytic water feed pipe, to an intermediate product generated as a result of decomposition of the organic compound contained in the polluted gas, thereby neutralizing the intermediate product, wherein said ultraviolet decomposition unit is connected to the alkali electrolytic water feed pipe and the acid electrolytic water feed pipe through valves, respectively, so that strong alkali electrolytic water and strong acid electrolytic water are selectively introduced by the opening/closing operation of said valves, thereby accelerating decomposition reaction of the organic compounds by the irradiation of ultraviolet rays, and said intermediate product treatment apparatus is connected to both ends of a circulation pipe to which a pump is provided at an intermediate position thereof, and is provided with a pH meter for measuring the pH values of the polluted gas circulating inside the intermediate product treatment apparatus, so that strong alkali electrolytic water and strong acid electrolytic water are selectively introduced through the alkali electrolytic water feed pipe and the acid electrolytic water feed pipe depending on the measured value of the pH meter.

2. The system for decomposing the organic compound according to claim 1, wherein said intermediate product treatment apparatus is installed at an intermediate part of said ultraviolet decomposition unit to selectively spray the strong alkali electrolytic water and the strong acid electrolytic water to the polluted gas within said ultraviolet decomposition unit.

3. The system for decomposing the organic compound according to claim 1, wherein said intermediate product treatment apparatus is connected to downstream side of said ultraviolet decomposition unit to selectively spray the strong alkali electrolytic water and the strong acid electrolytic water to the polluted gas having passed through said ultraviolet decomposition unit.

4. The system for decomposing the organic compound according to claim 1, wherein said ultraviolet decomposition unit is made up of a decomposing cell having a ultraviolet lamp set up therein, and a gas inlet is formed in a peripheral wall of said decomposition cell to allow the polluted gas to blow along a diameter of said decomposition cell.

5. The system for decomposing the organic compound according to claim 4, wherein said ultraviolet lamp includes a plurality of ultraviolet lamps hung down from an upper surface of said decomposition cell at equal intervals.

6. The system for decomposing the gaseous organic compound according to claim 4, wherein said ultraviolet lamp has a protection tube comprising a synthetic quartz glass that permits transmission of 80% or more of ultraviolet rays whose wavelength is not less than 172 nm.

* * * * *